United States Patent
Taguchi

(10) Patent No.: US 6,546,558 B1
(45) Date of Patent: Apr. 8, 2003

(54) VISUAL SCENARIO EDITOR FOR EDITING LINKS BETWEEN PRESENTATION SCREENS IN A MULTI-MEDIA APPLICATION

(75) Inventor: Daigo Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1069 days.

(21) Appl. No.: 08/747,356

(22) Filed: Nov. 13, 1996

(30) Foreign Application Priority Data

Nov. 14, 1995 (JP) .............................................. 7-294623

(51) Int. Cl.⁷ .............................................. G06F 15/00
(52) U.S. Cl. .................................... 725/500.1; 345/723
(58) Field of Search ................................ 345/302, 328, 345/335, 339, 348, 723; 707/501, 513, 514; 725/500.1

(56) References Cited

U.S. PATENT DOCUMENTS

| | | | | |
|---|---|---|---|---|
| 5,515,490 A | * | 5/1996 | Buchanan et al. | 345/302 |
| 5,608,859 A | | 3/1997 | Taguchi | 345/302 |
| 5,652,714 A | * | 7/1997 | Peterson et al. | 702/57 |
| 5,694,594 A | * | 12/1997 | Chang | 707/6 |
| 5,801,687 A | * | 9/1998 | Peterson et al. | 345/302 |
| 5,809,317 A | * | 9/1998 | Kogan et al. | 707/501 |

FOREIGN PATENT DOCUMENTS

| | | |
|---|---|---|
| JP | 2-32473 | 2/1990 |
| JP | 5-67184 | 3/1993 |
| JP | 6-259477 | 9/1994 |
| JP | 7-200775 | 8/1995 |
| JP | 7-287646 | 10/1995 |
| JP | 8-171550 | 7/1996 |
| JP | 8-202681 | 8/1996 |
| JP | 8-287157 | 11/1996 |
| JP | 9-6570 | 1/1997 |
| JP | 9-6754 | 1/1997 |

OTHER PUBLICATIONS

"ToolBook User's Manual", Asymetrix, 1994, pp. v–xii, 5–11, 5–12, 20–1 to 20–21.

"The Complete Hypercard Handbook", vol. 1, B.N.S. Inc., Mar. 31, 1988, pp. 3–12, 195–201 and 328.

H. Ohto et al., "A Multi–Media Presentation Systems Development Environment based on Scenario–Model", Info. Processing Academic Society, May 18, 1998, vol. 88, No. 32, pp. 1–8.

* cited by examiner

Primary Examiner—Stephen S. Hong
(74) Attorney, Agent, or Firm—Foley & Lardner

(57) ABSTRACT

A scenario edit device creates node icons representative of the presentation screens described in the scenario, data icons associated with and disposed within their respective node icons, and link graphic indicating links between the presentation screens. The node icons, the data icons, and the link graphic are displayed as an edit image. The links between the presentation screens that are described in the scenario are visually edited using the edit image.

18 Claims, 24 Drawing Sheets

FIG. 2

| PRESENTATION SCREEN NAME | MULTI-MEDIA DATA NAME | PRESENTATION SCREEN NAME OF LINK DESTINATION | SCREEN SHIFT CONDITION | PRESENTATION INFORMATION, ETC. |
|---|---|---|---|---|
| SCENE_1 | DATA_11 | SCENE_2 | MOUSE CLICK | |
| | DATA_12 | SCENE_4 | MOUSE CLICK | |
| | DATA_13 | SCENE_6 | MOUSE CLICK | |
| | DATA_14 | | | |
| SCENE_2 | DATA_21 | | | |
| | DATA_22 | SCENE_3 | MOUSE CLICK | |
| SCENE_3 | DATA_31 | | | |
| | DATA_32 | SCENE_4 | MOUSE CLICK | |
| SCENE_4 | DATA_41 | | | |
| | DATA_42 | | | |
| SCENE_5 | DATA_51 | | | |
| | DATA_52 | | | |
| SCENE_6 | DATA_61 | | | |
| | DATA_62 | | | |
| SCENE_7 | DATA_71 | | | |
| | DATA_72 | | | |

FIG. 3

| NODE ID | PRESENTATION SCREEN NAME | HORIZONTAL POSITION | VERTICAL POSITION | WIDTH | HEIGHT | DISPLAY NON-SCROLL IMAGE? | DATA ICON DISPLAY TYPE |
|---|---|---|---|---|---|---|---|
| 1 | SCENE_1 | 10 | 10 | 60 | 45 | NO | FRAME DISPLAY |
| 2 | SCENE_2 | 10 | 60 | 40 | 30 | NO | FRAME DISPLAY |
| 3 | SCENE_3 | 60 | 60 | 40 | 30 | NO | REDUCTION |
| 4 | SCENE_4 | 110 | 60 | 40 | 30 | NO | FRAME DISPLAY |
| 5 | SCENE_5 | 10 | 105 | 40 | 30 | NO | FRAME DISPLAY |
| 6 | SCENE_6 | 60 | 105 | 40 | 30 | NO | FRAME DISPLAY |
| 7 | SCENE_7 | 110 | 105 | 40 | 30 | NO | FRAME DISPLAY |

FIG. 6

| PRESENTATION SCREEN NAME | MULTI-MEDIA DATA NAME | PRESENTATION SCREEN NAME OF LINK DESTINATION | SCREEN SHIFT CONDITION | PRESENTATION INFORMATION, ETC. |
|---|---|---|---|---|
| SCENE_1 | DATA_11 | SCENE_2 | MOUSE CLICK | |
| | DATA_12 | SCENE_4 | MOUSE CLICK | |
| | DATA_13 | SCENE_6 | MOUSE CLICK | |
| | DATA_14 | SCENE_3 | MOUSE CLICK | |
| SCENE_2 | DATA_21 | | | |
| | DATA_22 | SCENE_3 | MOUSE CLICK | |
| SCENE_3 | DATA_31 | | | |
| | DATA_32 | SCENE_4 | MOUSE CLICK | |
| SCENE_4 | DATA_41 | | | |
| | DATA_42 | | | |
| SCENE_5 | DATA_51 | | | |
| | DATA_52 | | | |
| SCENE_6 | DATA_61 | | | |
| | DATA_62 | | | |
| SCENE_7 | DATA_71 | | | |
| | DATA_72 | | | |

FIG. 8

| PRESENTATION SCREEN NAME | MULTI-MEDIA DATA NAME | PRESENTATION SCREEN NAME OF LINK DESTINATION | SCREEN SHIFT CONDITION | PRESENTATION INFORMATION, ETC. |
|---|---|---|---|---|
| SCENE_1 | DATA_11 | SCENE_3 | MOUSE CLICK | |
| | DATA_12 | SCENE_4 | MOUSE CLICK | |
| | DATA_13 | SCENE_6 | MOUSE CLICK | |
| | DATA_14 | | | |
| SCENE_2 | DATA_21 | | | |
| | DATA_22 | SCENE_3 | MOUSE CLICK | |
| SCENE_3 | DATA_31 | | | |
| | DATA_32 | SCENE_4 | MOUSE CLICK | |
| SCENE_4 | DATA_41 | | | |
| | DATA_42 | | | |
| SCENE_5 | DATA_51 | | | |
| | DATA_52 | | | |
| SCENE_6 | DATA_61 | | | |
| | DATA_62 | | | |
| SCENE_7 | DATA_71 | | | |
| | DATA_72 | | | |

FIG. 10

| PRESENTATION SCREEN NAME | MULTI-MEDIA DATA NAME | PRESENTATION SCREEN NAME OF LINK DESTINATION | SCREEN SHIFT CONDITION | PRESENTATION INFORMATION, ETC. |
|---|---|---|---|---|
| SCENE_1 | DATA_11 | ///// | ///// | |
| | DATA_12 | SCENE_4 | MOUSE CLICK | |
| | DATA_13 | SCENE_6 | MOUSE CLICK | |
| | DATA_14 | | | |
| SCENE_2 | DATA_21 | | | |
| | DATA_22 | SCENE_3 | MOUSE CLICK | |
| SCENE_3 | DATA_31 | | | |
| | DATA_32 | SCENE_4 | MOUSE CLICK | |
| SCENE_4 | DATA_41 | | | |
| | DATA_42 | | | |
| SCENE_5 | DATA_51 | | | |
| | DATA_52 | | | |
| SCENE_6 | DATA_61 | | | |
| | DATA_62 | | | |
| SCENE_7 | DATA_71 | | | |
| | DATA_72 | | | |

FIG. 19

| NODE ID | PRESENTATION SCREEN NAME | HORIZONTAL POSITION | VERTICAL POSITION | WIDTH | HEIGHT | DISPLAY NON-SCROLL IMAGE? | DATA ICON DISPLAY TYPE |
|---|---|---|---|---|---|---|---|
| 1 | SCENE_1 | 10 | 10 | 60 | 45 | YES | FRAME DISPLAY |
| 2 | SCENE_2 | 10 | 60 | 40 | 30 | NO | FRAME DISPLAY |
| 3 | SCENE_3 | 60 | 60 | 40 | 30 | NO | REDUCTION |
| 4 | SCENE_4 | 110 | 60 | 40 | 30 | NO | FRAME DISPLAY |
| 5 | SCENE_5 | 10 | 105 | 40 | 30 | NO | FRAME DISPLAY |
| 6 | SCENE_6 | 60 | 105 | 40 | 30 | NO | FRAME DISPLAY |
| 7 | SCENE_7 | 110 | 105 | 40 | 30 | NO | FRAME DISPLAY |

FIG. 22

| PRESENTATION SCREEN NAME | MULTI-MEDIA DATA NAME | PRESENTATION SCREEN NAME OF LINK DESTINATION | SCREEN SHIFT CONDITION | PRESENTATION INFORMATION, ETC. |
|---|---|---|---|---|
| SCENE_1 | DATA_11 | SCENE_2 | MOUSE CLICK | |
| | DATA_12 | SCENE_4 | MOUSE CLICK | |
| | DATA_13 | SCENE_6 | MOUSE CLICK | |
| | DATA_14 | SCENE_5 | MOUSE CLICK | |
| SCENE_2 | DATA_21 | | | |
| | DATA_22 | SCENE_3 | MOUSE CLICK | |
| SCENE_3 | DATA_31 | | | |
| | DATA_32 | SCENE_4 | MOUSE CLICK | |
| SCENE_4 | DATA_41 | | | |
| | DATA_42 | | | |
| SCENE_5 | DATA_51 | | | |
| | DATA_52 | | | |
| SCENE_6 | DATA_61 | | | |
| | DATA_62 | | | |
| SCENE_7 | DATA_71 | | | |
| | DATA_72 | | | |

FIG. 24
(PRIOR ART)

| PRESENTATION SCREEN NAME | SCRIPT | MULTI-MEDIA DATA NAME | PRESENTATION SCREEN NAME OF LINK DESTINATION | SCREEN SHIFT CONDITION |
|---|---|---|---|---|
| SCENE_1 | | BUTTON_11 | SCENE_2 | MOUSE CLICK |
| | | BUTTON_12 | SCENE_4 | MOUSE CLICK |
| | | BUTTON_13 | SCENE_6 | MOUSE CLICK |
| | | BUTTON_14 | | |
| SCENE_2 | if mouse button click on BUTTON_22 then jump to SCENE_3 | DATA_21 | | |
| | | BUTTON_22 | | |
| SCENE_3 | | DATA_31 | | |
| | | BUTTON_32 | SCENE_4 | MOUSE CLICK |
| SCENE_4 | | DATA_41 | | |
| | | BUTTON_42 | | |
| SCENE_5 | | DATA_51 | | |
| | | BUTTON_52 | | |
| SCENE_6 | | DATA_61 | | |
| | | BUTTON_62 | | |
| SCENE_7 | | DATA_71 | | |
| | | BUTTON_72 | | |

VISUAL SCENARIO EDITOR FOR EDITING LINKS BETWEEN PRESENTATION SCREENS IN A MULTI-MEDIA APPLICATION

BACKGROUNDS OF THE INVENTION

1. Field of the Invention

The present invention relates to a scenario edit device which edits a scenario for a multi-media application, and particularly, it relates to a scenario edit device capable of editing a scenario primarily by an intuitive operation.

2. Description of the Related Art

In a multi-media application, there is an application having a hyperlink structure which allows shifting from one screen to another one by a user's pressing a button on the display screen presenting image data, text data, sound data, button and the like, with a predetermined pointer. When editing a scenario of the application having such a hyperlink structure, edit for the screen shift processing is essential to decide which presentation screen to be selected by which press of a button.

As a conventional tool for editing a scenario having a hyperlink structure, there are a "ToolBook" disclosed in the article "ToolBook User's Manual" (issued by Asymetrix, 1994) and a "HyperCard" disclosed in the article "The HyperCard" (issued by B.N.S. Inc. on Mar. 31, 1988).

FIG. 23 is a block diagram showing an example of a constitution of a portion relative to the screen shift edit according to the conventional scenario edit tool such as the "ToolBook" or "HyperCard". As illustrated in FIG. 23, the conventional scenario edit device comprises a scenario storage unit 2305 for storing a scenario for a multi-media application including the presentation screen shift, an edit image creating unit 2306 creating an edit image including the presentation screen designated by the scenario, an image display unit 2307 for displaying the edit image created by the edit image creating unit 2306, an input control unit 2301 controlling input signal from an input device such as a mouse, a keyboard or the like, and preserving information of the position of a pointing cursor and the key stroke, a script edit unit 2302 editing a script described in the scenario on the basis of the information from the input control unit 2301, a screen shift attribute changing unit 2303 changing a screen shift attribute described in the scenario on the basis of the information from the input control unit 2301, and a presentation screen switching unit 2304 switching the presentation screen included in the edit image which the edit image creating unit 2306 creates on the basis of the information from the input control unit 2301.

FIG. 24 is a view showing an example of components of the scenario information stored by the scenario storage unit 2305. The scenario information indicated in FIG. 24 includes the information such as the name of a presentation screen, a script corresponding to the presentation screen, a multi-media data name to be presented on the presentation screen, the presentation screen name of a link destination and the condition of a screen shift.

FIG. 25 is a view, which is created by the edit image creating unit 2306, for use in describing one example of the edit image displayed by the image display unit 2307. FIG. 26 is a view for use in describing one example of the edit screen in the case of editing a script by the script edit unit 2302. FIG. 27 is a view for use in describing one example of the edit screen in the case of editing the screen attribute by the screen shift attribute changing unit 2303.

A movement in the screen shift edit by the use of the above conventional scenario edit device will be described in FIGS. 23 to 27.

Assume that the scenario indicated in FIG. 24 is stored in the scenario storage unit 2305. An operation of editing the screen shift toward the presentation screen "SCENE_3" by the operation toward the multi-media data "BUTTON_22" on the presentation screen "SCENE_2" will be as follows.

The display image switching unit 2304, upon receipt of the instruction "Start the edit of the presentation screen "SCENE_2"" from the information preserved in the input control unit 2301, instructs the edit image creating unit 2306 to create the edit image of the presentation screen "SCENE_2". The edit image creating unit 2306 creates the edit image including the presentation screen "SCENE_2" as illustrated in FIG. 25. The image display unit 2307 displays the created edit image. The script edit unit 2302, upon receipt of the instruction "Start the script edit of the presentation screen presented in the edit image being displayed on the image display unit 2307" from the information preserved in the input control unit 2301, starts the script edit (refer to FIG. 26) of the presentation screen "SCENE_2". The edit of the script characters enables the screen shift edit into the presentation screen "SCENE_3" by the operation toward the multi-media data "BUTTON_22" presented on the presentation screen "SCENE_2".

An edit operation, according to the above conventional scenario edit device, for shifting the screen to the presentation screen "SCENE_6" by the operation toward the multi-media data "BUTTON_13" presented on the presentation screen "SCENE_1" will be as follows.

The presentation screen switching unit 2304, upon receipt of the instruction "Start the edit of the presentation screen "SCENE_1"" from the information preserved in the input control unit 2301, instructs the edit image creating unit 2306 to create the edit image of the presentation screen "SCENE_1". The edit image creating unit 2306 creates the edit image including the presentation screen "SCENE_1". The image display unit 2307 displays the created edit image. The screen shift attribute changing unit 2303, upon receipt of the instruction "Start the edit of the screen shift attribute of the multi-media data presented in the edit image being displayed on the image display unit 2307" from the information preserved in the input control unit 2301, edits the dialogue box for the screen shift attribute as for the multi-media data "BUTTON_13" (refer to FIG. 27), and selectively determines the presentation screen to which this screen is shifted and the condition of the screen shift. This enables the screen shift edit into the presentation screen "SCENE_6" by the operation toward the multi-media data "BUTTON_13" presented on the presentation screen "SCENE_1".

The conventional scenario edit device, however, requires the edit of a script language, the selection of the presentation screen name of a shift destination as the attribute of each multi-media data and the input of the same, as mentioned above. Owing to this, it is necessary for an editor to have a fair knowledge of the script language and memorize the presentation screen name of a shift destination, which results in a great burden to the editor.

Further, it is impossible for the conventional scenario edit device to do such a visual and intuitive edit work as to discriminate a presentation screen and a screen shift processing at a glance, create the screen shift processing, change the screen of a shift destination and delete the screen shift processing, thereby resulting in a poor working efficiency.

SUMMARY OF THE INVENTION

A first object of the present invention is to provide a scenario edit device in which, on the edit screen for editing a scenario for a multi-media application, presentation screens presented at execution of the application are made into icons and the relation of the screen shift between the presentation screens is expressed by an arrow or the like so that a hyperlink structure can be viewed at a glance and a scenario editor can understand the structure of the scenario visually and intuitively, thereby improving the working efficiency of the edit work.

A second object of the present invention is to provide a scenario edit device capable of editing a scenario about the screen shift by such an intuitive operation as to create the screen shift operation with an arrow drawn between icons of the presentation screens, change a shift destination and a shift source while changing an arrow and delete the screen shift operation by deleting an arrow, without requesting the scenario editor to learn the script language and memorize the name of the presentation screen of the shift destination, thereby reducing the burden of the scenario editor.

A third object of the present invention is, in addition to the above two objects, to provide a scenario edit device capable of making the confirmation by a scenario editor easy and steady, and reducing the errors in the created scenario, by performing an edit work with an visual and intuitive operation.

A fourth object of the present invention is to provide a scenario edit device in which, in the case where the size of the region of the edit image for use in the edit work is larger than the display size of the presentation screen, an edit image with a scroll bar is created and displayed on the display screen, so as to edit the whole edit image by the operation of the scroll bar, and an edit work can be performed also on the scenario including a lot of presentation screens in the complicated shift relation, with a visual and intuitive operation, thereby preventing decrease in the working efficiency.

A fifth object of the present invention is to provide a scenario edit device in which, in the case where the size of the region of the edit image for use in the edit work is larger than the display size of the display screen, the display screen is divided into a non-scroll region and a scroll region, and with a certain node icon displayed in the non-scroll region, the edit work can be performed visually and intuitively about the shift between icons which cannot be displayed on the display screen at once, thereby preventing decrease in the working efficiency.

According to the first aspect of the invention, a scenario edit device for editing a scenario for a multi-media application including description about a shift of a presentation screen, comprises a scenario storage means for storing the scenario;

a node icon creating means for creating a node icon indicating a presentation screen described in the scenario;

a link graphic creating means for creating a link graphic expressing the presentation screen shift;

an edit image creating means creating an edit image with the node icon and the link graphic disposed thereon;

an edit-time display manner storage means for storing an edit-time display manner including information on at least the display position of the node icon within the edit image; and a screen display means for displaying the edit image created by said edit image creating means.

In the preferred construction, the node icon creating means comprises a data icon creating means for creating data icons indicating multi-media data to be presented on the presentation screen corresponding to the node icon during execution of an application as for each node icon, and a data icon disposing means for disposing the corresponding data icons within the node icon.

In the preferred construction, the node icon creating means comprises a data icon creating means for creating data icons each formed in a reduction image of multi-media data or in a schematic graphic indicating the multi-media data to be presented on the presentation screen corresponding to the node icon during execution of an application as for each node icon, and a data icon disposing means for disposing the corresponding data icons within the node icon.

In another preferred construction, the scenario edit device further comprises an input control means for controlling input signal entered from a given input device by use of the edit image displayed on said image display means and preserving information on the input signal, and a screen shift changing means for detecting a given operation regarding an edit for a screen shift processing from the information preserved in said input control means, and updating the scenario stored in said scenario storage means according to the content of the above edit operation.

In another preferred construction, the scenario edit device further comprises an input control means for controlling input signal entered from a given input device by use of the edit image displayed on said image display means and preserving information on the input signal, and a screen shift changing means for detecting a given operation regarding an edit for a screen shift processing, including at least an operation of drawing a link graphic, an operation of changing a link source or a link destination of the link graphic being displayed, and an operation of deleting the link graphic being displayed, from the information preserved in said input control means, and updating the scenario stored in said scenario storage means according to the content of the above edit operation, the screen shift changing means, in the case where the content of the detected edit operation means the operation of drawing a link graphic, adds a screen shift processing indicated by the added link graphic on to the scenario stored in said scenario storage means, in the case where the content of the detected edit operation means the operation of changing a link source or a link destination of the link graphic, changes the corresponding shift source or shift destination indicated by the changed link graphic in the scenario stored in said scenario storage means, and in the case where the content of the detected edit operation means the operation of deleting the link graphic, deletes the corresponding screen shift processing indicated by the deleted link graphic in the scenario stored in said scenario storage means.

According to the second aspect of the invention, a scenario edit device for editing a scenario for a multi-media application including description about a shift of a presentation screen, comprises a scenario storage means for storing the scenario;

a node icon creating means for creating a node icon indicating a presentation screen described in the scenario;

a link graphic creating means for creating a link graphic expressing the presentation screen shift.

an edit image creating means for creating an edit image with the node icon and the link graphic disposed thereon, an edit-time display manner storage means for storing an edit-time display manner including information on at least the display position of the node icon within the edit image, a scroll control means for instructing said edit image creating means to create an edit image with a scroll bar attached there depending on necessity when the size of a region of the edit image created by said edit image creating means is larger than the display size of the display screen on said image display means, a screen shift analyzing means for analyzing the information on the screen shift described in the scenario stored in said scenario storage means and the information on the display position of the node icon stored in said edit-time display manner storage means, and instructing said edit image creating means to display a link graphic with a tag indicating a link destination or a link source, in stead of the link graphic which can be displayed within the edit screen because the size of the edit image is larger than the size of the display screen, and a screen display means for displaying the edit image created by said edit image creating means.

In the preferred construction, the node icon creating means comprises a data icon creating means for creating data icons indicating multi-media data to be presented on the presentation screen corresponding to the node icon during execution of an application as for each node icon, and a data icon disposing means for disposing the corresponding data icons within the node icon.

In the preferred construction, the node icon creating means comprises a data icon creating means for creating data icons each formed in a reduction image of multi-media data or in a schematic graphic indicating the multi-media data to be presented on the presentation screen corresponding to the node icon during execution of an application as for each node icon, and a data icon disposing means for disposing the corresponding data icons within the node icon.

In another preferred construction, the scenario edit device further comprises an input control means for controlling input signal entered from a given input device by use of the edit image displayed on said image display means and preserving information on the input signal, and a screen shift changing means for detecting a given operation regarding an edit for a screen shift processing from the information preserved in said input control means, and updating the scenario stored in said scenario storage means according to the content of the above edit operation.

In another preferred construction, the scenario edit device further comprises an input control means for controlling input signal entered from a given input device by use of the edit image displayed on said image display means and preserving information on the input signal, and a screen shift changing means for detecting a given operation regarding an edit for a screen shift processing, including at least an operation of drawing a link graphic, an operation of changing a link source or a link destination of the link graphic being displayed, and an operation of deleting the link graphic being displayed, from the information preserved in said input control means, and updating the scenario stored in said scenario storage means according to the content of the above edit operation, the screen shift changing means, in the case where the content of the detected edit operation means the operation of drawing a link graphic, adds a screen shift processing indicated by the added link graphic on to the scenario stored in said scenario storage means, in the case where the content of the detected edit operation means the operation of changing a link source or a link destination of the link graphic, changes the corresponding shift source or shift destination indicated by the changed link graphic in the scenario stored in said scenario storage means, and in the case where the content of the detected edit operation means the operation of deleting the link graphic, deletes the corresponding screen shift processing indicated by the deleted link graphic in the scenario stored in said scenario storage means.

According to the third aspect of the invention, a scenario edit device for editing a scenario for a multi-media application including description about a shift of a presentation screen, comprises a scenario storage means for storing the scenario;

a node icon creating means for creating a node icon indicating a presentation screen described in the scenario;

a link graphic creating means for creating a link graphic expressing the presentation screen shift;

an edit image creating means for creating an edit image with the node icon and the link graphic disposed thereon;

an edit-time display manner storage means for storing an edit-time display manner including information on at least the display position of the node icon within the edit image;

a scroll control means for instructing said edit image creating means to create an edit image with a scroll bar attached there depending on necessity when the size of a region of the edit image created by said edit image creating means is larger than the display size of the display screen on said image display means;

a screen shift analyzing means for analyzing the information on the screen shift described in the scenario stored in said scenario storage means and the information on the display position of the node icon stored in said edit-time display manner storage means, and instructing said edit image creating means to display a link graphic with a tag indicating a link destination or a link source, in stead of the link graphic which can be displayed within the edit screen because the size of the edit image is larger than the size of the display screen;

a non-scroll edit image creating means, in the case where said edit image creating means creates an edit image with a scroll bar attached there by the control of said scroll control means, for creating a non-scroll edit image, that is not scrolled, independent of the edit image with a scroll bar, an image display means for displaying the edit image created by said edit image creating means, and in the case where said edit image creating means creates an edit image with a scroll bar by the control of said scroll control means and said non-scroll edit image creating means creates a non-scroll edit image, for displaying the display screen divided into a scroll region for displaying the edit image with a scroll bar and a non-scroll display region for displaying the non-scroll edit image;

an input control means for controlling input signal entered from a given input device by use of the edit image displayed on said image display means or the display image consisting of a scroll region and a non-scroll region, and preserving information on the input signal;

a screen shift changing means for detecting a given operation regarding an edit for a screen shift processing from the information preserved in said input control means, and updating the scenario stored in said scenario storage means according to the content of the above edit operation; and a non-scroll display specification means for detecting an operation of displaying the node icon in the non-scroll region displayed on the display screen of said image display means, from the information preserved in said input control means, and changing the edit-time display manner stored in said edit-time display manner storage means so that the corresponding node icon can be displayed in the non-scroll region, according to the content of the operation.

In the preferred construction, the screen shift changing means, in the case where the content of the detected edit operation means the operation of drawing a link graphic, adds a screen shift processing indicated by the added link graphic on to the scenario stored in said scenario storage means, in the case where the content of the detected edit operation means the operation of changing a link source or a link destination of the link graphic, changes the corresponding shift source or shift destination indicated by the changed link graphic in the scenario stored in said scenario storage means, and in the case where the content of the detected edit operation means the operation of deleting the link graphic, deletes the corresponding screen shift processing indicated by the deleted link graphic in the scenario stored in said scenario storage means.

In another preferred construction, the screen shift changing means, while handling an edit of a link graphic consisting of a scroll region and a non-scroll region, which is displayed on the display screen of said image display unit, similarly to the edit of a link graphic within the edit image created by said edit image creating means, updates the scenario stored in said scenario storage means according to the content of the edit operation, and the screen shift analyzing means, in the case of entering a link graphic consisting of a scroll region and a non-scroll region, which is displayed on the display screen of said image display unit, instructs said edit image creating means to display the link graphic with a tag reflecting the content of the operation at a link source or a link destination specified by the operation.

Further objects, features and effects of the present invention will be apparent from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a view showing an example of components of a scenario stored in the scenario storage unit according to the first embodiment.

FIG. 3 is a view showing an example of a display method at the edit time stored in the edit time display manner storage unit according to the first embodiment.

FIG. 6 is a view showing an scenario in the case of performing the edit as shown in FIG. 5.

FIG. 8 is a view showing a scenario in the case of performing the edit as shown in FIG. 7.

FIG. 10 is a view showing a scenario in the case of performing the edit as shown in FIG. 9.

FIG. 19 is a view showing information on the edit-time display manner stored in the edit-time display manner storage unit in the case of performing an edit indicated in FIGS. 15 to 18.

FIG. 22 is a view showing a scenario in the case of performing an edit indicated in FIGS. 21 and 22.

FIG. 24 is a view showing an example of a constitution of a scenario stored in the scenario storage-unit of the conventional scenario edit device.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
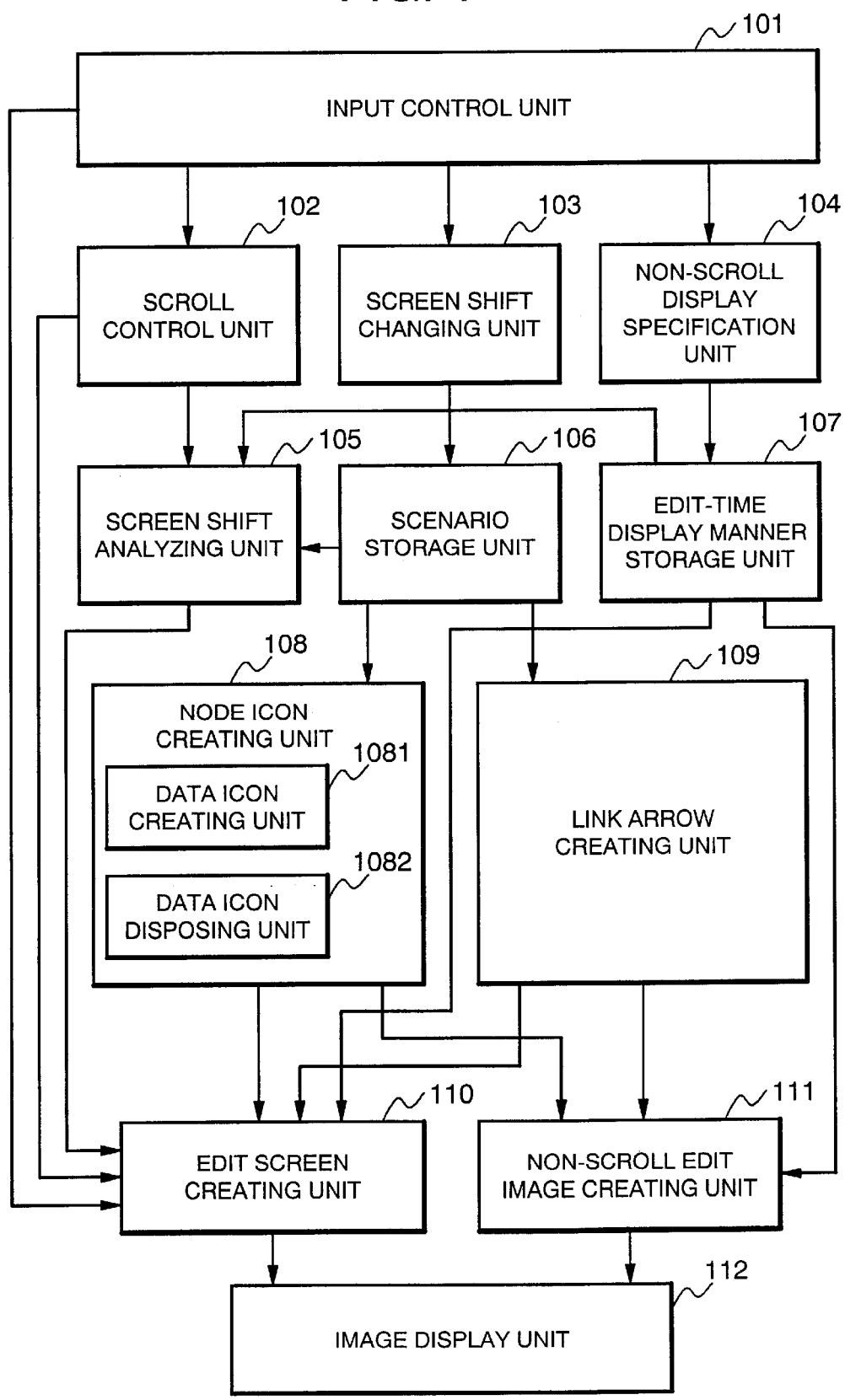
FIG. 1 is a block diagram showing a constitution of a scenario edit device according to the first embodiment of the present invention.

FIG. 1 is a block diagram showing a constitution of a scenario edit device according to a first embodiment of the present invention.

As illustrated in FIG. 1, the scenario edit device of the first embodiment comprises an input control unit 101 controlling input signal from an input device and preserving input information, a screen shift changing unit 103 performing a screen shift edit on a scenario, a scenario storage unit 106 for storing a scenario of a multi-media application, an edit-time display manner storage unit 107 and a non-scroll display specification unit 104 deciding the display position, display size and display method of a node icon and storing the same, a node icon creating unit 108 creating a node icon, a link arrow creating unit 109 creating a link arrow, an edit screen creating unit 110, a non-scroll edit image creating unit 111, a scroll control unit 102 and a screen shift analyzing unit 105 which create an edit screen, and an image display unit 112 for displaying an edit image. Only the particular constitution of this embodiment is described in FIG. 1, while omitting the description of the other general constitution.

The input control unit 101 is realized by a storage such as a RAM or a magnetic disk, or a predetermined storage unit. The unit 101 controls input signal entered with a pointing device such as a mouse, or an input device such as a keyboard, and preserves input information such as the position of a pointing cursor, key stroke and the like.

The scenario storage unit 106 is realized by an internal memory such as a RAM, or an external memory such as a magnetic disk or the like, which stores the scenario for a multi-media application to be edited. The scenario to be edited according to this embodiment includes, as a movement, a shift of a presentation screen by an interactive operation and a shift of a presentation screen according to the passage of time. The items and contents of the scenario information to be stored in the scenario storage unit 106 can be arranged selectively. FIG. 2 is a view for use in describing one example of components of the scenario information the scenario storage unit 106 stores. The scenario information includes information such as presentation screen name that is the name of a presentation screen, data name of a multi-media data to be presented on a presentation screen, presentation screen name of a link destination and, condition of a screen shift. Moreover, display information such as display position of a multi-media data, display time, display effect or the like can be stored depending on the necessity.

The node icon creating unit 108 is realized by a CPU controlled by a program, which creates a node icon indicating one presentation screen described in a scenario. A node icon is formed in a figure such as a rectangle which expresses a presentation screen, with the data icon described later disposed within the figure. One node icon corresponds to one presentation screen. As illustrated in FIG. 1, the node icon creating unit 108 includes a data icon creating unit 1081 creating a data icon indicating a multi-media data and a data icon disposing unit 1082 disposing data icons within a node icon. A data icon is an icon formed by a reduction image of a multi-media data presented during execution of the application, or formed by a schematic figure indicating the multi-media data. The data icon expresses a multi-media data for use in the presentation screen indicated by a node icon with the data icons disposed therein, and one data icon corresponds to one multi-media data.

The link arrow creating unit 109 is realized by a CPU controlled by a program, which creates a link arrow expressing the shift of a presentation screen. A link arrow is an arrow (effective segment) showing a shifting state of a presentation screen.

The edit image creating unit 110 is realized by a CPU controlled by a program, which creates an edit image for use in the scenario edit. On the edit image, a node icon created by the node icon creating unit 108, and a link arrow created by the link arrow creating unit 109 are disposed at a proper position.

The edit-time display manner storage unit 107 is realized by an internal storage such as a RAM, or an external storage such as a magnetic disk or the like, which stores the display position, display size, display method and the like of a node icon on the edit image. The contents to be stored in the edit-time display manner storage unit 107 can be arranged selectively. FIG. 3 is a view for use in describing one example of the edit-time display manner information which the edit-time display manner storage unit 107 stores. In the example indicated in FIG. 3, the edit-time display manner information includes the information on a node ID for identifying a node icon, presentation screen name, position and size (horizontal position, vertical position, width, height) of a node icon on the edit image, presence or absence of a display on a non-scroll screen described later, display type of a data icon and the like.

Figure 4:
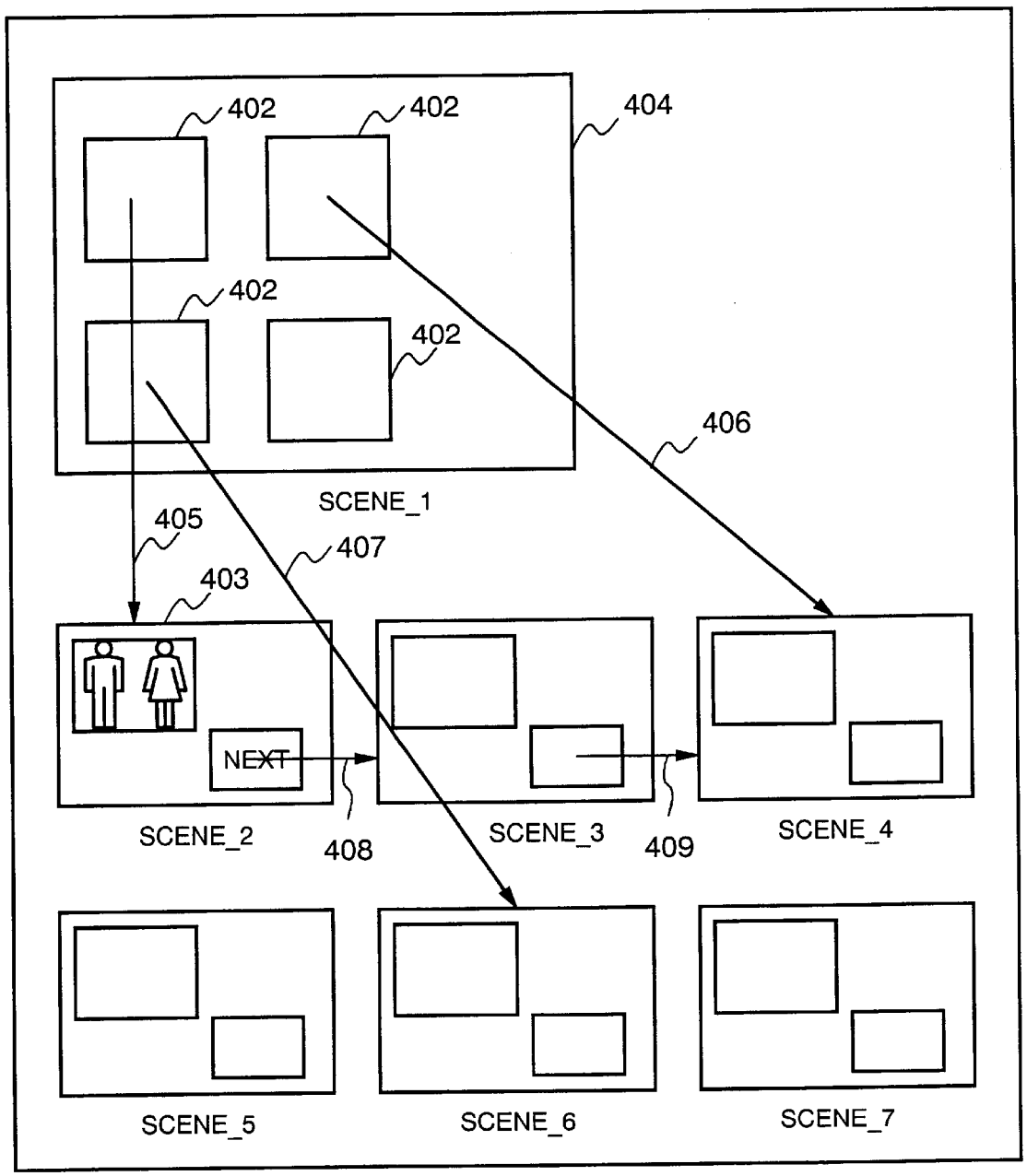
FIG. 4 is a view showing an example of an edit image created by the edit image creating unit according to the first embodiment.

The image display unit 112 is realized by a display or the like, which displays an edit image created by the edit image creating unit 110. Further, depending on the necessity, it also displays the image created by the non-scroll edit image creating unit 111 described later. FIG. 4 is a view showing one example of the edit image. In this example shown in FIG. 4, the edit image created by the edit image creating unit 110 expresses presentation screens "SCENE_1" to "SCENE_7", including a data icon 401 showing a reduction image of a multi-media data, a data icon 402 expressing the multi-media data in a figure, node icons 403 and 404, and a link arrow 405 expressing the screen shift.

The screen shift changing unit 103 is realized by a CPU controlled by a program, which judges the content of a user input on the basis of the information preserved in the input control unit 101, and changes the content of the screen shift information included in the scenario according to the content of the user input. More specifically, the unit 103 judges, from the information of the input control unit 101, which operation is intended by the content of the user input, of an operation of drawing a link arrow from a data icon to a node icon on the edit image being displayed on the image display unit 112, an operation of changing the node icon indicated by a link arrow on the edit image and an operation of deleting a link arrow on the edit image. As a result, when the content of the user input intends the operation of drawing a link arrow, the unit 103 changes the screen shift information on the scenario stored in the scenario storage unit 106 and a screen shift processing indicated by the drawn link arrow is added there. When the content of the user input intends the operation of changing the destination of a link arrow, the unit 103 changes the screen shift information on the scenario and changes the destination screen to the presentation screen corresponding to the node icon newly indicated by the link arrow. When the content of the user input intends the operation of deleting a link arrow, the unit 103 changes the screen shift information on the scenario and deletes the screen shift processing indicated by the link arrow having been deleted.

The scroll control unit 102, the screen shift analyzing unit 105, the non-scroll display specification unit 104 and the non-scroll edit image creating unit 111 are used so as to edit the scenario thus constituted when the region size of the edit image created by the edit image creating unit 110 is larger than the display size of the display screen on the image display unit 112.

Figure 11:
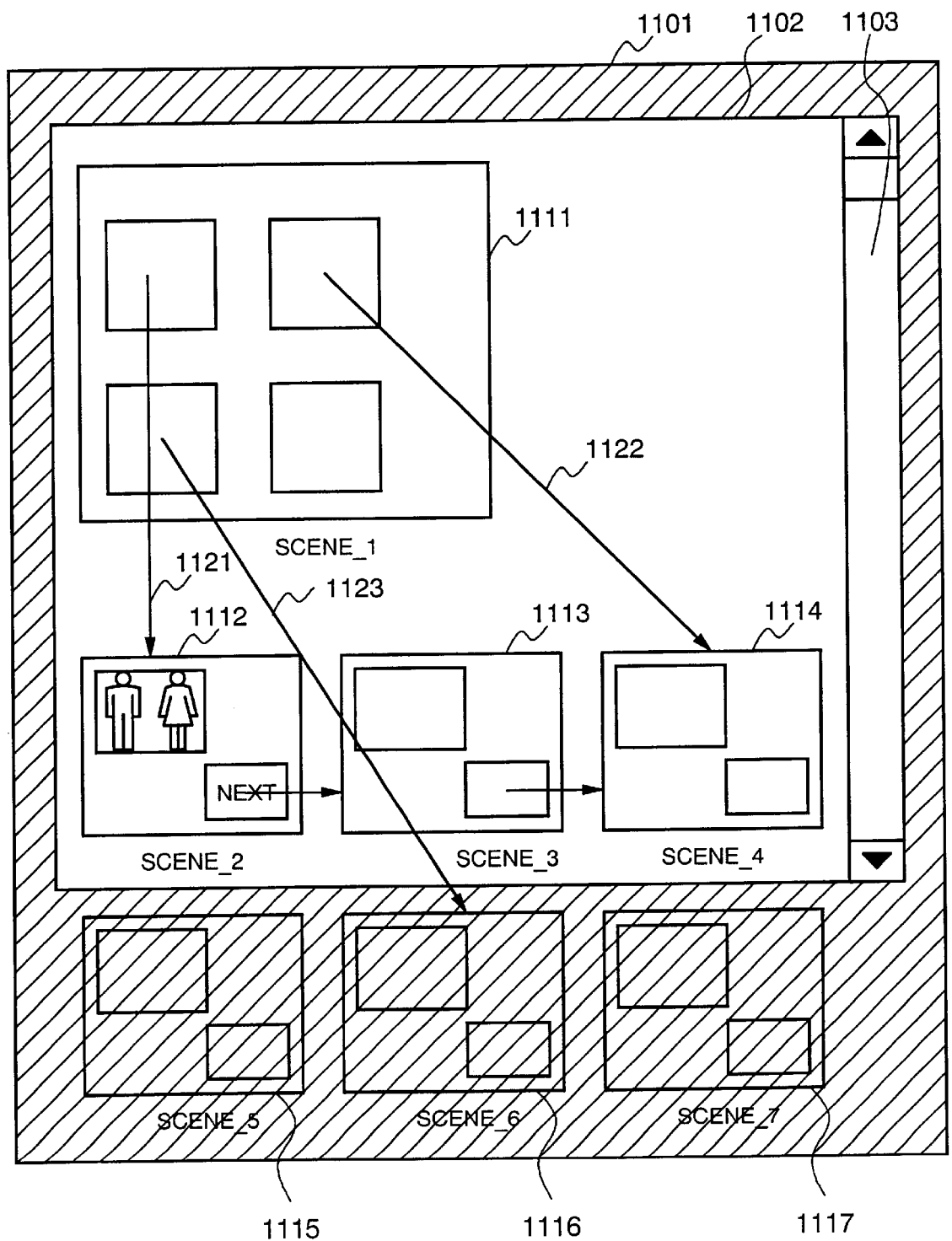
FIG. 11 is a view showing the relationship between the edit image and display screen in the case where the size of the region of the edit image is larger than the display size of the display screen, and also showing the case of displaying the upper portion of the edit image on the display screen.
Figure 12:
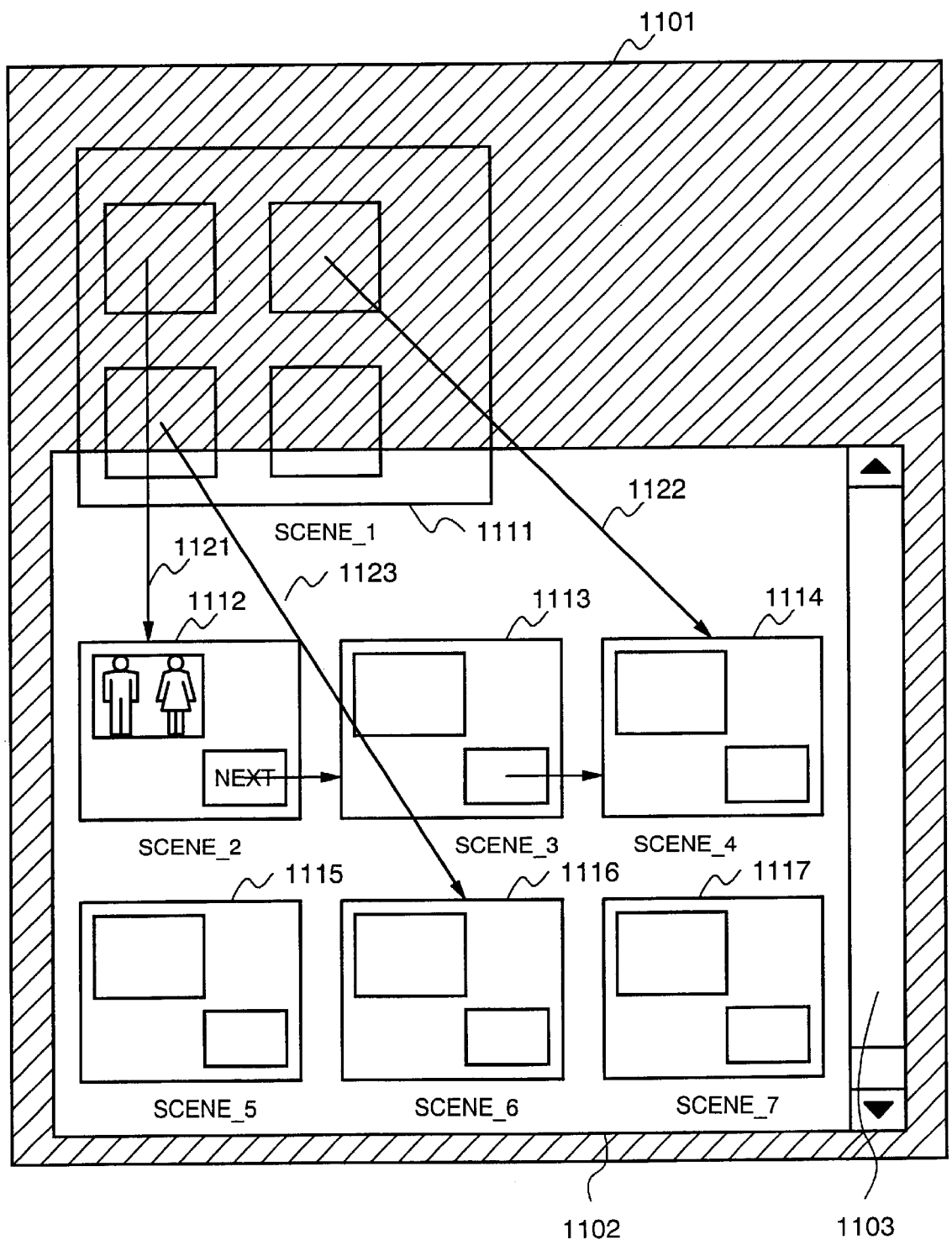
FIG. 12 is a view showing the relationship between the edit image and display screen in the case where the size of the region of the edit image is larger than the display size of the display screen, and also showing the case of displaying the lower portion of the edit image on the display screen.

The scroll control unit 102 is realized by a CPU controlled by a program, which instructs the edit image creating unit 110 to create an edit image with a scroll bar. FIGS. 11 and 12 show an example of the edit image with a scroll bar which is created when the region size of the edit image is larger than the display size on the image display unit 112. In these drawings, only one part of the edit region 1101 of the edit image created by the edit image creating unit 110 can be displayed on the display screen 1102 of the image display unit 112. An editor can perform an edit in the whole region 1101 while making the upper portion of the region 1101 displayed as illustrated in FIG. 11, or making the lower portion of the region 1101 displayed as illustrated in FIG. 12, by operating the scroll bar. In the drawings, though only the scroll bar 1103 in the vertical direction is attached here, a scroll bar in the horizontal direction can be attached depending on the size difference between the edit region 1101 and the display screen 1102.

The screen shift analyzing unit 105 is realized by a CPU controlled by a program, which analyzes the screen shift information stored in the scenario storage unit 106 and the positional information of the node icon stored in the edit-time display manner storage unit 107. When the size of the edit region is larger than the size of the display screen on the image display unit 112, so that a link arrow is out of the display screen on the image display unit 112 and it cannot be displayed on the edit image, as illustrated in FIGS. 11 and 12, the unit 105 instructs the edit image creating unit 110 to display a link destination or a link source by the use of a link arrow with a tag attached there, instead of the link arrow.

Figure 13:
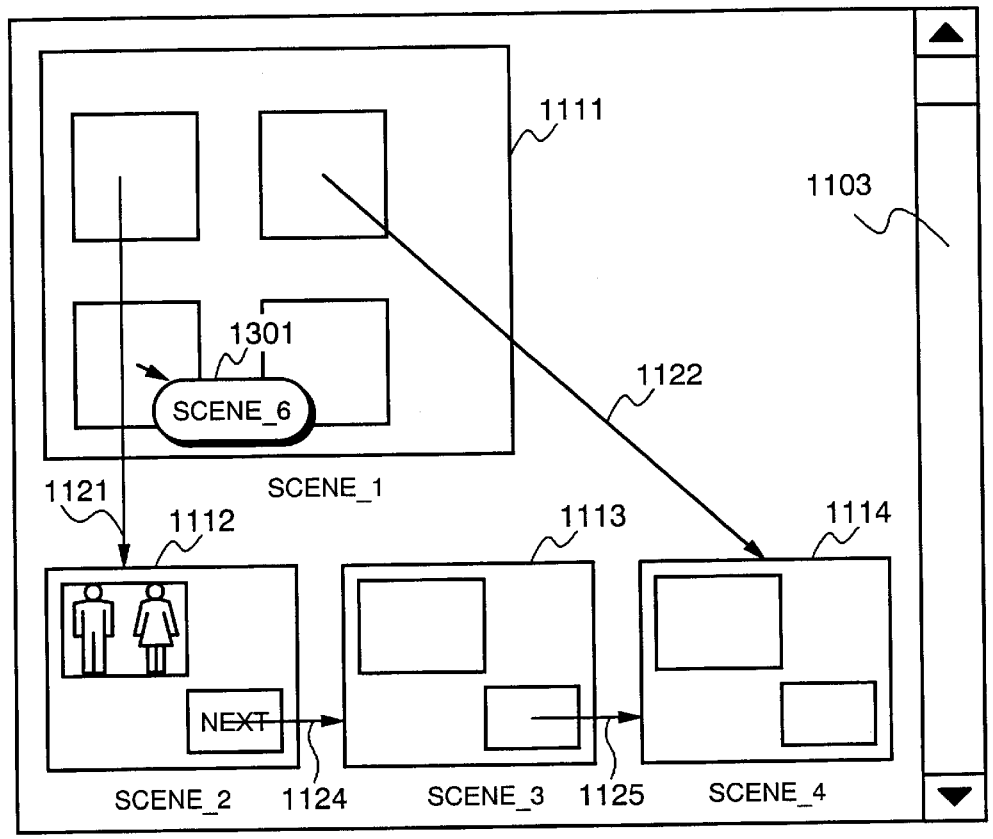
FIG. 13 is a view showing a display image displayed on the image display unit actually in the case where the edit image and the display screen are in the positional relation as showing in FIG. 11.
Figure 14:
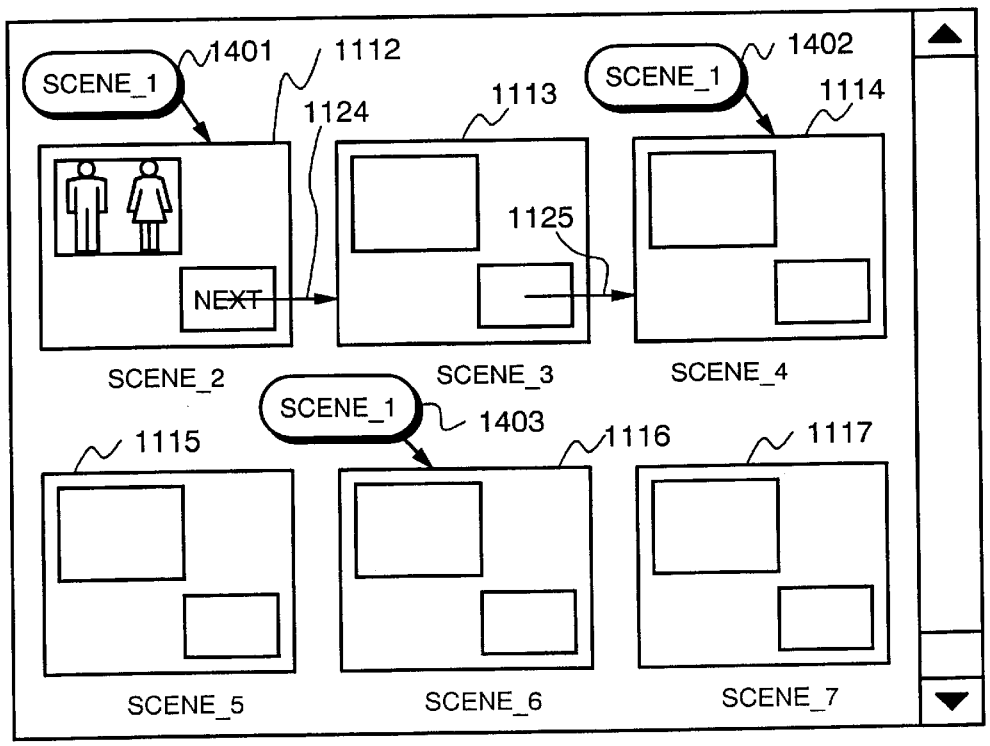
FIG. 14 is a view showing a display image displayed on the image display unit actually in the case where the edit image and the display screen are in the positional relation as showing in FIG. 12.

For example, the example of FIG. 11 shows a link from the node icon 111 on the presentation screen "SCENE_1" to the node icon 1116 on the presentation screen "SCENE_6" (refer to the link arrow 1123). However, since the node icon 1116 is positioned outside of the display screen 1102, the link arrow 1123 cannot be displayed as a whole. Therefore, instead of the link arrow 1123, the link arrow 1301 with a tag "SCENE_6" attached there indicating the presentation screen of the link destination is displayed as illustrated in FIG. 13. Then, the example of FIG. 12 shows a link from the node icon 1111 on the presentation screen "SCENE_1" to the node icon 1112 on the presentation screen "SCENE_2" (link arrow 1121), a link from the same node icon 1111 to the node icon 1114 on the presentation screen "SCENE_4" (link arrow 1122), and a link from the same node icon 1111 to the node icon 1116 on the presentation screen "SCENE_6" (link arrow 1123). However, since the node icon 111 isn't displayed on the display screen 1102, the link arrows 1121, 1122 and 1123 cannot be displayed as a whole. Therefore, link arrows 1401, 1402 and 1403 respectively with a tag "SCENE_1" attached there indicating the presentation screen of the link source are respectively displayed as illustrated in FIG. 14.

The non-scroll display specification unit 104 is realized by a CPU controlled by a program, which performs an alternation on the edit-time display manner stored in the edit-time display manner storage unit 107 so as to display the non-scroll region on the edit image. More specifically, when the unit 104 judges the input to be of an operation for specifying the display of a node icon in a non-scroll region on the basis of the information stored in the input control unit 101, it changes the edit-time display manner so as to display the non-scroll region as well as the node icon in the same non-scroll region. The non-scroll region is a region for displaying the node icon and link information disposed outside of the display screen when the edit image is larger than the display screen on the image display unit 112 and there exists a node icon in the region which is not displayed on the display screen. The image displayed in the non-scroll region is an image independent of the above edit image.

The non-scroll edit image creating unit 111 is realized by a CPU controlled by a program. The unit 111 creates a non-scroll edit image with the node icon located there, which icon is specified to be displayed in the non-scroll region by the edit-time display manner storage unit 107, and displays it on the image display unit 112. The image display unit 112, upon receipt of the non-scroll edit image created by the non-scroll edit image creating unit 111, displays the non-scroll region with the display screen divided into a scroll region and a non-scroll region, as illustrated in FIGS. 15 to 18. Therefore, on the display screen, there are a non-scroll region 1501 and a scroll region 1502 which can be scrolled over the edit region with a scroll bar. On the scroll region 1502, displayed is the edit image with a scroll bar created by the edit image creating unit 110 according to the control of the above-mentioned scroll control unit 102.

This time, an operation of the scenario edit device of this embodiment thus constituted will be described. An operation in the case where a scroll region and a non-scroll region are not distinctively displayed will be described at first.

Assume that the scenario stored in the scenario storage unit 106 has such a structure as indicated in FIG. 2. As indicated in FIG. 2, in the scenario, four multi-media data "DATA_11", "DATA_12", "DATA_13" and "DATA_14" are presented on the presentation screen "SCENE_1", and when a mouse button is clicked with the pointing cursor placed on the multi-media data "DATA_11", the screen is shifted to the presentation screen "SCENE_2" under this condition. Similarly, this scenario includes the following content; when a mouse button is clicked with the pointing cursor placed on the multi-media data "DATA_12", the screen is shifted to the presentation screen "SCENE_4" and when a mouse button is clicked with the pointing cursor placed on the multi-media data "DATA_13", the screen is shifted to the presentation screen "SCENE_6". Further, the edit-time display manner storage unit 107 stores the display manner at the edit time as indicated in FIG. 3 as a form for display in the case of editing the above scenario. In this example, the position and the size of a node icon on each presentation screen are set up in the display method, and additionally, it is set up in that a non-scroll image display is not performed on each display screen, a data icon arranged on the presentation screen "SCENE_3" is displayed in a reduction image and a data icon disposed on the other presentation screen is displayed by a frame only.

FIG. 4 is a view showing an example of a constitution of an edit image satisfying the above condition. Since this example shows the case where a screen with a scroll bar and a non-scroll screen are not distinctively displayed, the edit image of FIG. 4 is displayed on the display screen of the image display unit 112 as it is.

The node icon creating unit 108 creates node icons 403, 404 according to the content of the scenario indicated in FIG. 2. The data icon creating unit 1081 mounted on the node icon creating unit 108 creates data icons 401, 402 according to the content of the scenario. The data icon disposing unit 1082 disposes data icons 401, 402 within the node icons 403, 404 according to the content of the scenario. The disposition of the data icons on the node icon may be in correspondence with the disposition of the multi-media data corresponding to the respective data icons on the presentation screen corresponding to the same node icon, or the data icons may be disposed in the presentation order of the multi-media data existing within the presentation screen corresponding to the same node icon. The above processing of creating a node icon is similarly performed on all the presentation screen described in the scenario of FIG. 2 stored in the scenario storage unit 106.

The link arrow creating unit 109 creates a link arrow 405 according to the screen shift from the multi-media data "DATA_11" within the presentation screen "SCENE_1" to the presentation screen "SCENE_2". Similarly, it creates link arrows 406 to 409 according to the other screen shifts described in the scenario.

The edit image creating unit 110 locates the node icon created by the node icon creating unit 108 and the link arrow created by the link arrow creating unit 109 according to the edit-time display manner stored in the edit-time display manner storage unit 107, and creates the edit image as indicated in FIG. 4. The image display unit 112 displays the edit image created by the edit image creating unit 110.

A movement of the screen shift edit will be described with reference to FIGS. 5 to 10. FIG. 5 is a view showing an edit image in the case of adding a screen shift processing on to the scenario, and FIG. 6 is a view showing a scenario having been edited. FIG. 7 is a view showing an edit image in the case of changing the screen of a shift destination in the screen shift processing described in the scenario, and FIG. 8 is a view showing a scenario having been edited. FIG. 9 is a view showing an edit screen in the case of deleting a predetermined screen shift processing described in the scenario, and FIG. 10 is a view showing a scenario having been edited.

The operation of adding a screen shift processing will be described with reference to FIGS. 5 and 6. A screen shift processing for shifting a screen from the data icon 502 disposed at the node icon 501 on the presentation screen "SCENE_1" to the presentation screen "SCENE_3".

Figure 5A:
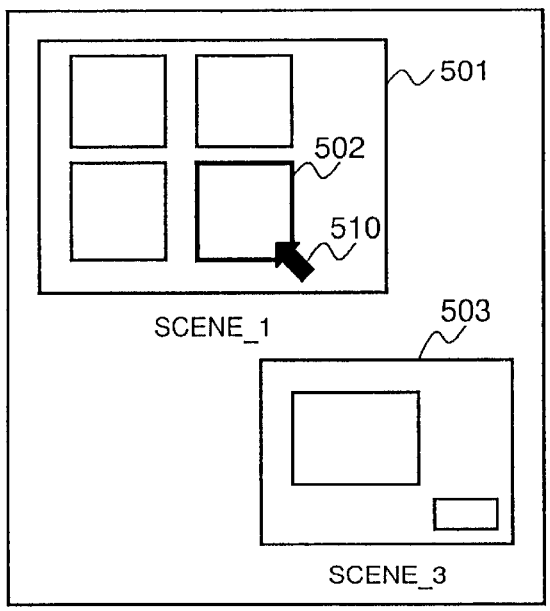
FIG. 5 is a view showing an edit screen in the case of additional screen shift processing being performed on the scenario.
Figure 5B:
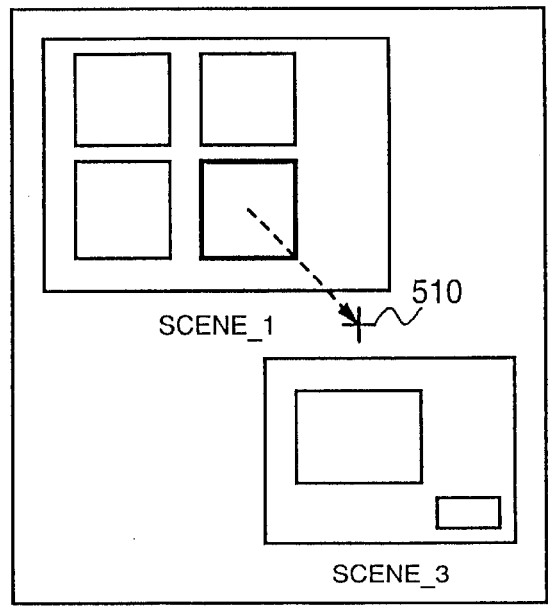
Figure 5C:
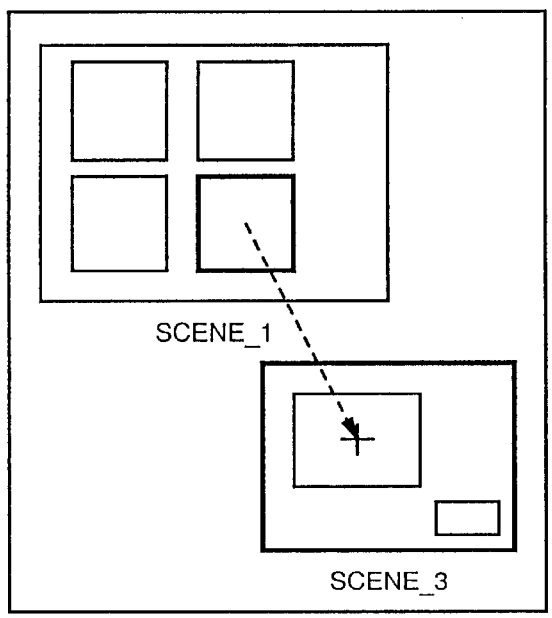

As indicated in FIG. 5(A), the pointing cursor 510 is moved to on the data icon 502 disposed in the node icon 501 while operating a mouse, when a mouse button is pressed so to specify the object. In this example, the frame of the data icon 502 to be processed and the frame of the node icon 501 including the same data icon 502 become bold, so that an editor can confirm that it has been specified. It is needless to say that various methods can be used in order to express the specified icon, such as expressing it in a different color, other than the above method of expressing it in a bold line.

Figure 5D:
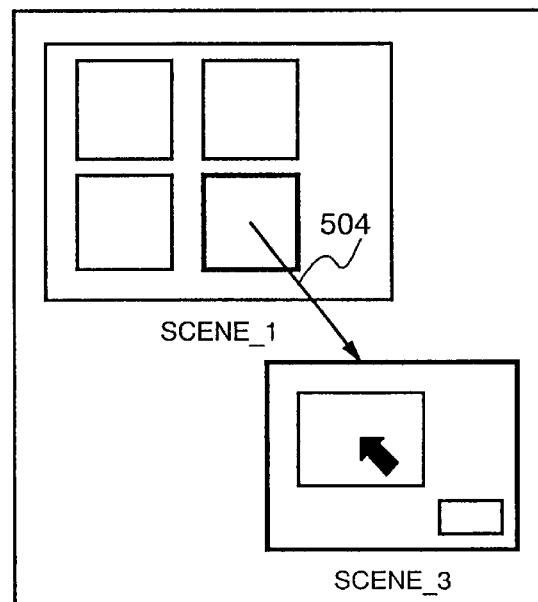

Next, in order to enter the link arrow showing a link, the pointing cursor 510 is moved to the node icon 503 of the shift destination while dragging the mouse. That is, the mouse is moved to the node icon 503 with the mouse button pressed, thereby moving the pointing cursor 510 there (refer to FIGS. 5(B) and (C)). After the pointing cursor 510 have been moved to the node icon 503, the mouse button is released, or the drag operation is finished, with the result that the node icon 503 of the presentation screen "SCENE_3" is specified as the shift destination from the data icon 502, and the link arrow 504 indicating the content of the screen shift is displayed (refer to FIG. 5(D)). In these examples of FIGS. 5(B) and (C), an arrow of broken line is shown according to the movement of the pointing cursor, starting from the data icon 502 as a link source to the place "+" indicated by the pointing cursor 510 and indicating the dragging operation. Therefore, an editor can achieve an edit work easily confirming it on the edit screen. In the example of FIG. 5(D), the frame of the node icon 503 specified as a shift destination becomes bold.

The scenario indicated in FIG. 6 is the scenario stored in the scenario storage unit 106 after adding on to the scenario indicated in FIG. 6 an operation of screen shift from the multi-media data "DATA_14" on the presentation screen "SCENE_1" to the presentation screen "SCENE_3", according to the edit operation described in reference to FIG. 5. The multi-media data "DATA_14" in FIG. 6 corresponds with the data icon 502 in FIG. 5. The item requiring description of the added screen shift processing is shaded.

When an editor executes the edit operation described in reference to FIG. 5 overlooking the edit image shown on the image display unit 112, the screen shift changing unit 103 recognizes the operation of drawing a link arrow from the data icon indicating the multi-media data "DATA_14" to the presentation screen "SCENE_3". In the shaded portion of FIG. 6, "SCENE_3" is filled in the item "Presentation Screen Name of Link Destination" and "mouse click" is filled in the item "Screen Shift Condition" with respect to the multi-media data "DATA_14", thereby to add the operation of screen shift from the multi-media data "DATA_14" to the presentation screen "SCENE_3". As for the screen shift condition, it is needless to say that a specified key input or the like can be set up other than a mouse click indicated in this example.

The operation of changing a screen of a shift destination will be described with reference to FIGS. 7 and 8. Here, the screen of a link destination in the image shift processing indicated by the link arrow 701, more specifically in the processing for screen shift from the data icon 703 disposed on the node icon 702 of the presentation screen "SCENE_1" to the presentation screen "SCENE_2" is changed to the presentation screen "SCENE_3".

Figure 7A:
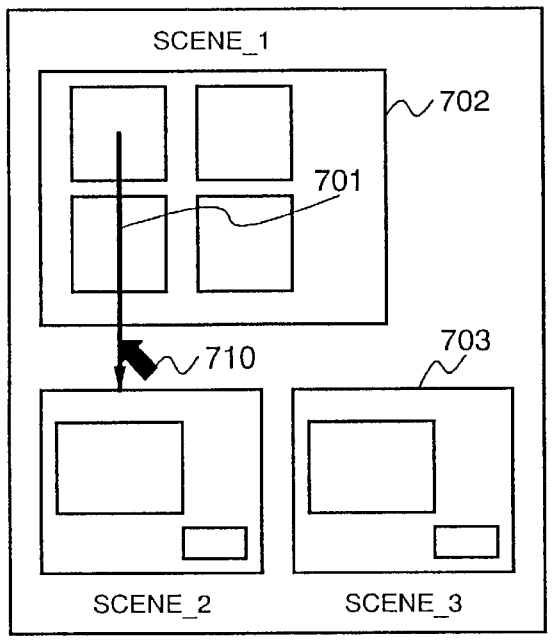
FIG. 7 is a view showing an edit screen in the case of changing the screen of the shift destination in the screen shift processing described in the scenario.

As illustrated in FIG. 7(A), the pointing cursor 710 is moved to on the link arrow 701 with a mouse, where the mouse button is pressed so to specify the screen shift processing. In order to move the end point of the link arrow

Figure 7B:
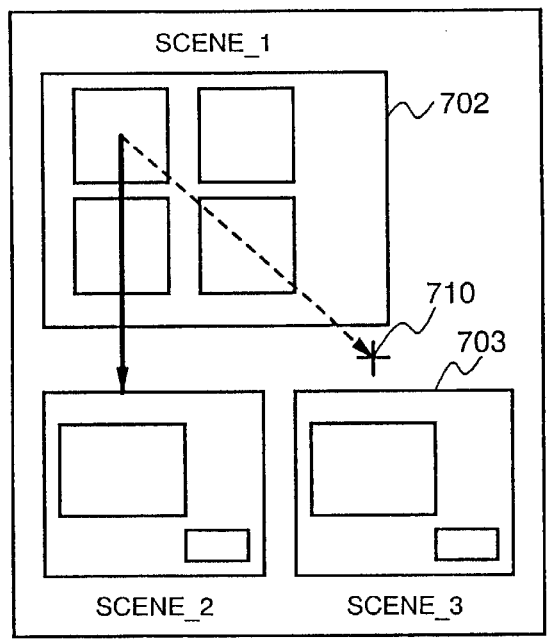
Figure 7C:
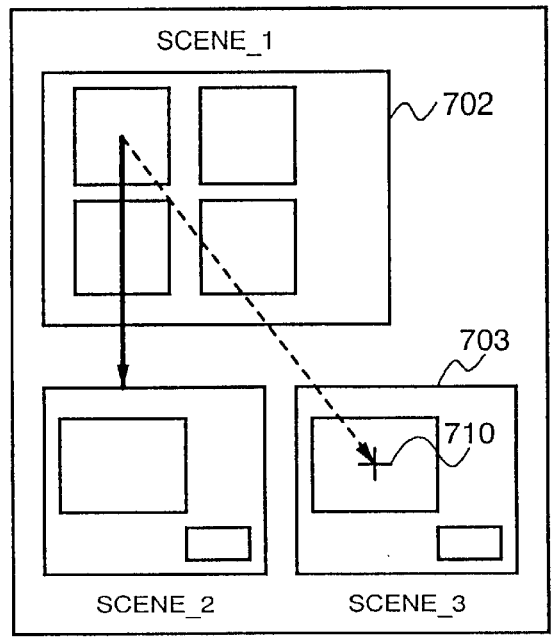
Figure 7D:
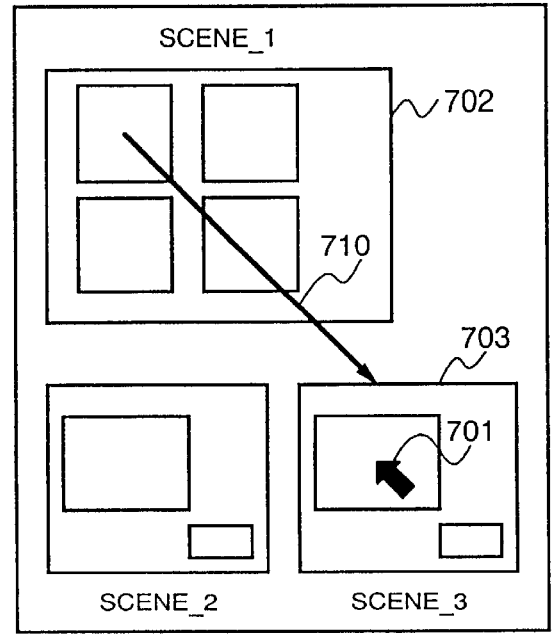

701, the pointing cursor 710 is moved to the node icon 704 of a new shift destination while dragging the mouse (refer to FIGS. 7(B) and (C)). After the pointing cursor 710 is moved to the node icon 703, the mouse button is released and the dragging operation is finished, with the result that the node icon 703 of the presentation screen "SCENE_3" is specified as a new link destination indicated by the link arrow 701, and the end point of the link arrow 701 is changed (refer to FIG. 7(D)). In these examples of FIGS. 7(B) and (C), an arrow of a broken line starting from the same start point as that of the link arrow 701 to the end point "+" indicated by the pointing cursor 710 and indicating the dragging operation, is shown so that an editor can achieve an edit work easily.

The change of the link arrow 701 includes the case of changing a link source other than the case of changing a link destination as mentioned above. In the state of FIG. 7(A), when the pointing cursor 710 is located on the side toward the end point from the middle point of the line forming the link arrow 701 and the mouse button is pressed there, the link destination is changed. When the pointing cursor 710 is located on the side toward the start point and the mouse button is pressed there, the link source is changed. Therefore, the change in the link destination and the link source can be switched easily. Further, the change in the link destination and the link source may be respectively related to a specified key, thereby to switch the change in combination with a mouse click.

The scenario indicated in FIG. 8 is the scenario stored in the scenario storage unit 106 after changing the shift destination to the presentation screen "SCENE_3", in the screen shift processing from the multi-media data "DATA_11" on the presentation screen "SCENE_1" to the presentation screen "SCENE_2" in the scenario indicated in FIG. 2, according to the edit operation described in reference to FIG. 7. In FIG. 8, the content of the item "Presentation Screen Name of Link Destination" and the item "Screen Shift Condition" with respect to the multi-media data "DATA_11" corresponds with the link arrow 701 of FIG. 7. The item for filling in the changed shift destination is shaded.

When an editor executes an edit operation described in reference to FIG. 7 overlooking the edit image shown on the image display unit 112, the screen shift changing unit 103 recognizes the operation of changing the link destination of the link arrow 701. The item "Presentation Screen Name of Link Destination" with respect to the multi-media data "DATA_11" is changed from "SCENE_2" to "SCENE_3" as indicated by the shaded portion of FIG. 8.

The operation of deleting a screen shift processing will be described with reference to FIGS. 9 and 10. A screen shift processing indicated by the link arrow 901, or the processing for shifting a screen from the data icon 903 disposed on the node icon 902 of the presentation screen "SCENE_1" to the presentation screen "SCENE_2" is deleted.

Figure 9A:
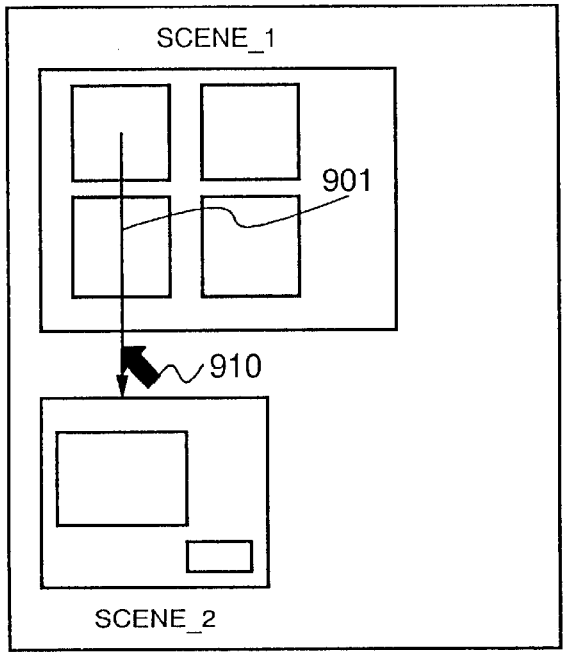
FIG. 9 is a view showing an edit screen in the case of deleting a predetermined screen shift processing described in the scenario.
Figure 9B:
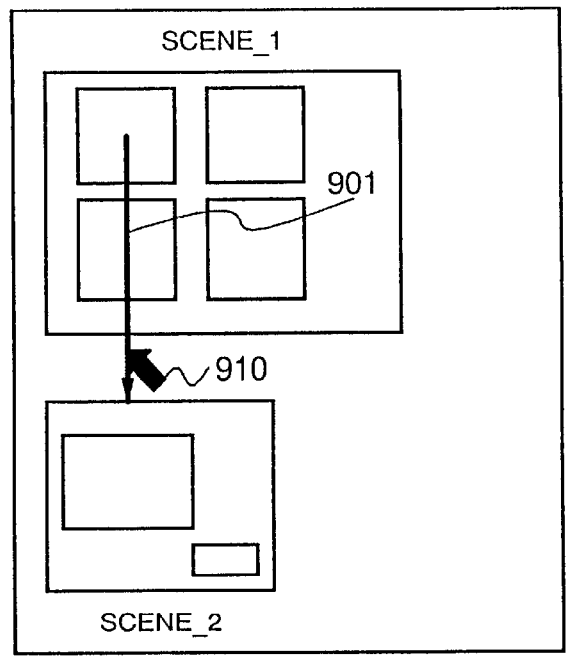
Figure 9C:
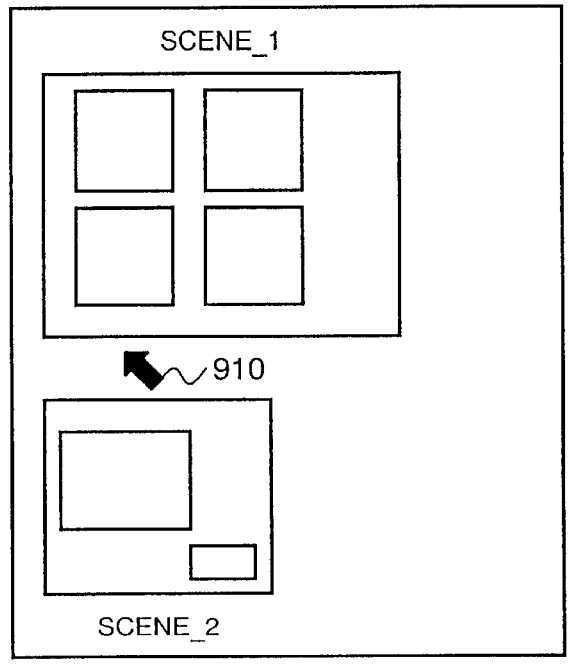

As indicated in FIG. 9(A), the pointing cursor 910 is moved to the link arrow 901 while operating a mouse, when the mouse button is pressed so to specify the object (refer to FIG. 9(B)). The link arrow 901 is deleted by the delete operation, such as a key related to the delete function on a key board, or a delete menu, previously set up for the execution of delete (refer to FIG. 9(C)). In the example indicated in FIG. 9(B), the link arrow 901 specified as the object to be processed is shown in a bold line.

The scenario indicated in FIG. 10 is the scenario stored in the scenario storage unit 106 after deleting from the scenario indicated in FIG. 2, the screen shift processing from the multi-media data "DATA_11" on the presentation screen "SCENE_1" to the presentation screen "SCENE_2", according to the edit operation described in reference to FIG. 9. The content of the item "Presentation Screen Name of Link Destination" and the item "Screen Shift Condition" with respect to the multi-media data "DATA_11" in FIG. 10 corresponds with the link arrow 901 in FIG. 9. These items are shaded.

When an editor executes the edit operation described in reference to FIG. 9 overlooking the edit image shown on the image display unit 112, the screen shift changing unit 103 recognizes the operation of deleting the screen shift processing indicated by the link arrow 901. The content of the item "Presentation Screen Name of Link Destination" and the item "Screen Shift Condition" with respect to the multi-media data "DATA_11" is deleted as indicated by the shaded portion of FIG. 10.

The operation of the screen shift edit in the case where the size of the region of the edit image created by the edit image creating unit 110 is larger than the display size of the display screen on the image display unit 112 will be described hereinafter.

FIGS. 11 and 12 show the relation between the edit image created by the edit image creating unit 110 and the display screen on the image display unit 112. On the display screen 1102 of the image display unit 112, a part of the edit region 1101 of the edit image created by the edit image creating unit 110, as illustrated in these drawings. The display screen 1102 is scrolled over the edit region 1101 while operating a scroll bar 1103 attached on the display screen 1102 by the scroll control unit 102, thereby making it possible to display the whole edit region 1101.

As illustrated in these drawings, the node icons 1111 to 1117 of the presentation screens "SCENE_1" to "SCENE_7" are disposed on the edit region 1101 and data icons of the multi-media data are appropriately disposed on each node icon. On the edit region 1101, displayed are the link arrows 1121, 1122, 1123 indicating the respective screen shifts toward the respective node icons 1112, 1114, 1116 of the respective presentation screens "SCENE_2", "SCENE_4", "SCENE_6" from the data icon disposed on the node icon 1111 of the presentation screen "SCENE_1", the link arrow 1123 indicating the screen shift from the data icon disposed on the node icon 1112 of the presentation screen "SCENE_2" to the node icon 1113 of the presentation screen "SCENE_3", and the link arrow 1125 indicating the screen shift from the data icon disposed on the node icon 1113 of the presentation screen "SCENE_3" to the node icon 1114 of the presentation screen "SCENE_4".

FIG. 11 shows the state in the case of displaying the upper portion of the edit region 1101 on the display screen 1102. Accordingly, the node icon 1115 of the presentation screen "SCENE_5", the node icon 1116 of the presentation screen "SCENE_6" and the node icon 1117 of the presentation screen "SCENE_7" are located outside of the display screen 1102, and they are not actually displayed there. FIG. 12 shows the state in the case of displaying the lower portion of the edit region 1101 on the display screen 1102. Accordingly, a part of the node icon 1111 of the presentation screen "SCENE_1" is out of the display screen 1102, and the node icon 1111 is not actually displayed on the display screen.

FIG. 13 is a display image actually displayed on the image display unit in the case where the edit image and the display screen are in the positional relation as indicated in FIG. 11. In FIG. 13, since the node icon 1116 cannot be displayed on the display screen, the link arrow 1301 with the tag "SCENE_6" attached there indicating the presentation screen of the link destination is illustrated, instead of the link arrow 1121.

FIG. 14 is a display image actually displayed on the image display unit in the case where the edit image and the display screen are in the positional relation as indicated in FIG. 12. In FIG. 14, since the node icon 1111 cannot be shown on the display screen, the link arrows 1401, 1402, 1403 respectively with the tag "SCENE_1" attached there indicating the presentation screen of the link source are illustrated, in stead of the link arrows 1121, 1122, 1123.

The scroll control unit 102, upon receipt of the information on the scroll region of the edit image from the input control unit 101, executes control of the screen shift analyzing unit 105 on the basis of the received information. The screen shift analyzing unit 105 discriminates between the link arrow which can be displayed on the edit image and the link arrow which cannot be displayed there, on the basis of the screen shift information stored in the scenario storage unit 106 and the position and size of the node icon stored in the edit-time display manner storage unit 107. In the example as shown in FIG. 11, the link destination of the link arrow 1123 is judged to be impossible of display. The screen shift analyzing unit 105 instructs the edit image creating unit 110 to display the screen shift corresponding to the link arrow 1123 with the link arrow with a tag 1301 as indicated in FIG. 13.

Similarly, in the example as indicated in FIG. 12, the screen shift analyzing unit 105 can't display the link source of the link arrows 1121, 1122, 1123 on the display screen 1102. The unit 105 instructs the edit image creating unit 110 to display the screen shifts corresponding to the link arrows 1121, 1122, 1123 respectively with the link arrows having tags 1401, 1402, 1403.

With respect to the link arrow with a tag, the edit of changing the presentation screen of a link destination and deleting the screen shift processing can be performed in the same operation as of the link arrow. In the above examples, in the link arrow with a tag, the tag includes the content such as the presentation screen name of a link destination and a link source. However, other information may be included as far as it enables the distinction of the presentation screen.

An operation of the screen shift edit in the case of displaying the non-scroll region on the display screen of the image display unit 112 will be described this time.

FIGS. 15 to 18 are views each showing a constitution of a display screen on the image display unit 112 in the case of performing an edit work by the us e of a non-scroll region. The display screen on the image display unit 112 is divided into the non-scroll region 1501 and the scroll region 1502 as illustrated in these drawings. An edit region of the edit image is similar to the edit region 1101 indicated in FIGS. 11 and 12. One part of the edit region 1101 is displayed similarly to on the display screen 1102 indicated in FIGS. 11 and 12.

Figure 15:
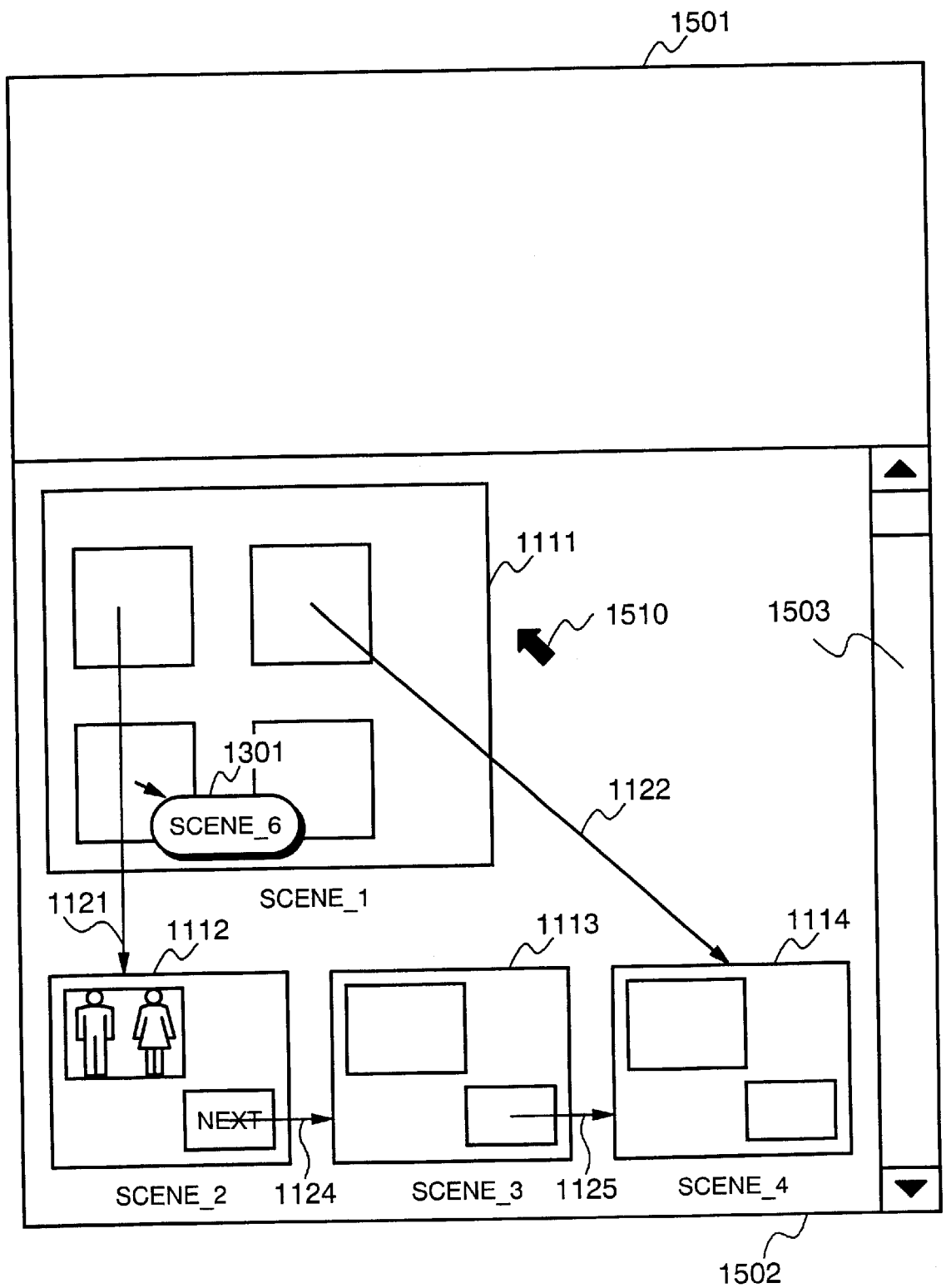
FIG. 15 is a view showing a constitution example of a display screen in the case of performing the edit work by the use of non scroll region and also showing the display screen at the edit operation starting time.

FIG. 15 shows the di splay screen at the time of starting the edit operation. In this step, nothing is displayed on the non-scroll region 1501. The image displayed on the scroll region 1502 is identical to the display image indicated in FIG. 13.

Figure 16:
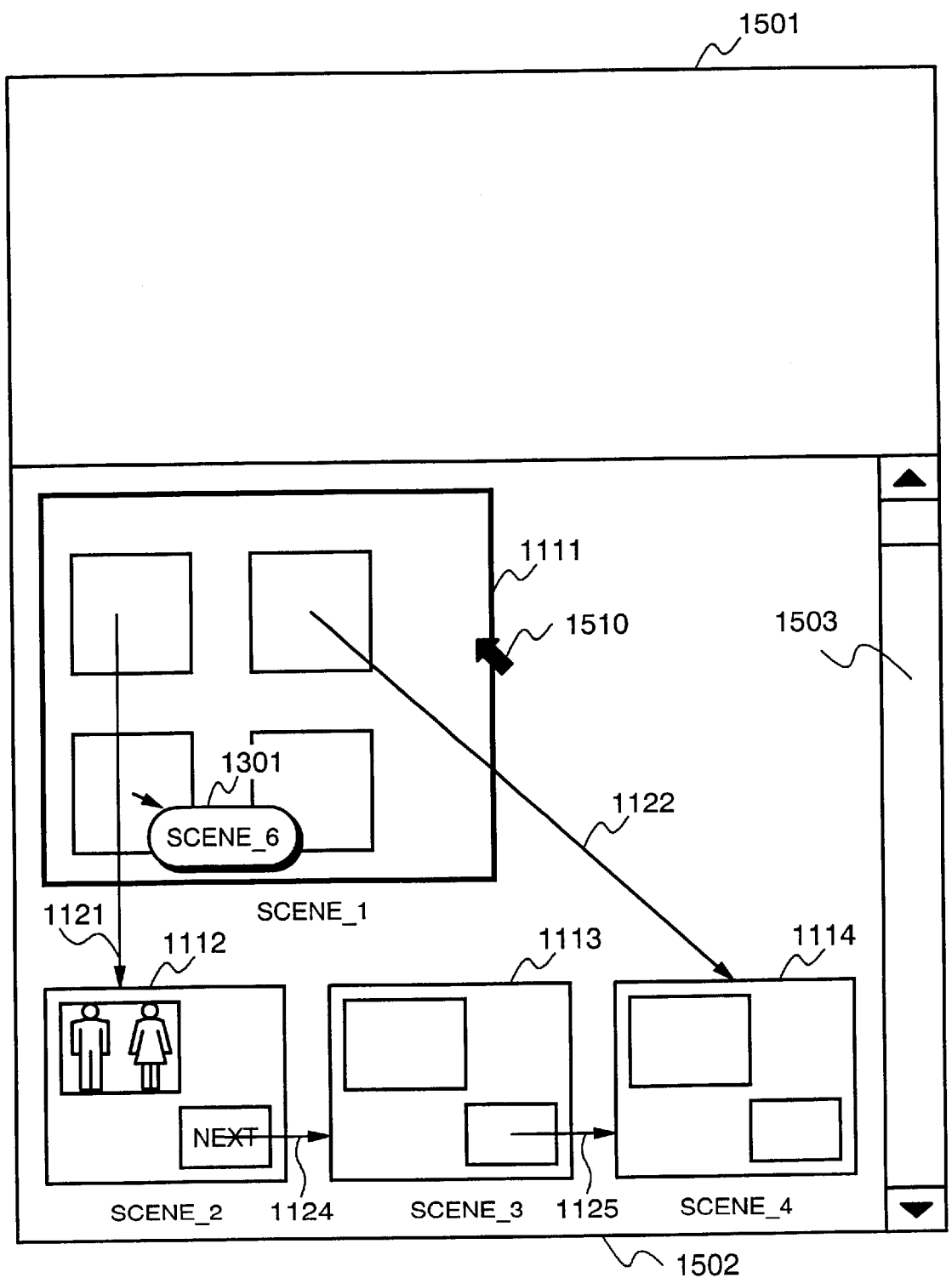
FIG. 16 is a view showing an example of a constitution of a display screen in the case of performing an edit work by the use of a non-scroll region, and also showing the state in the case where the items to be displayed in the non-scroll region are specified.

FIG. 16 shows the state in the case where the object to be displayed on the non-scroll region is specified. In this example, the pointing cursor 1510 is moved to the node icon 1111 indicating the presentation screen "SCENE_1" and the mouse button is released there, thereby to specify the node icon 1111 as the object to be displayed on the non-scroll region. The frame of the specified node icon 1111 is shown in a bold line so that an editor can confirm the specification. It is needless to say that various methods can be used such as expressing the specification in a different color, other than the method of expressing it in a bold line as indicated in this example.

Figure 17:
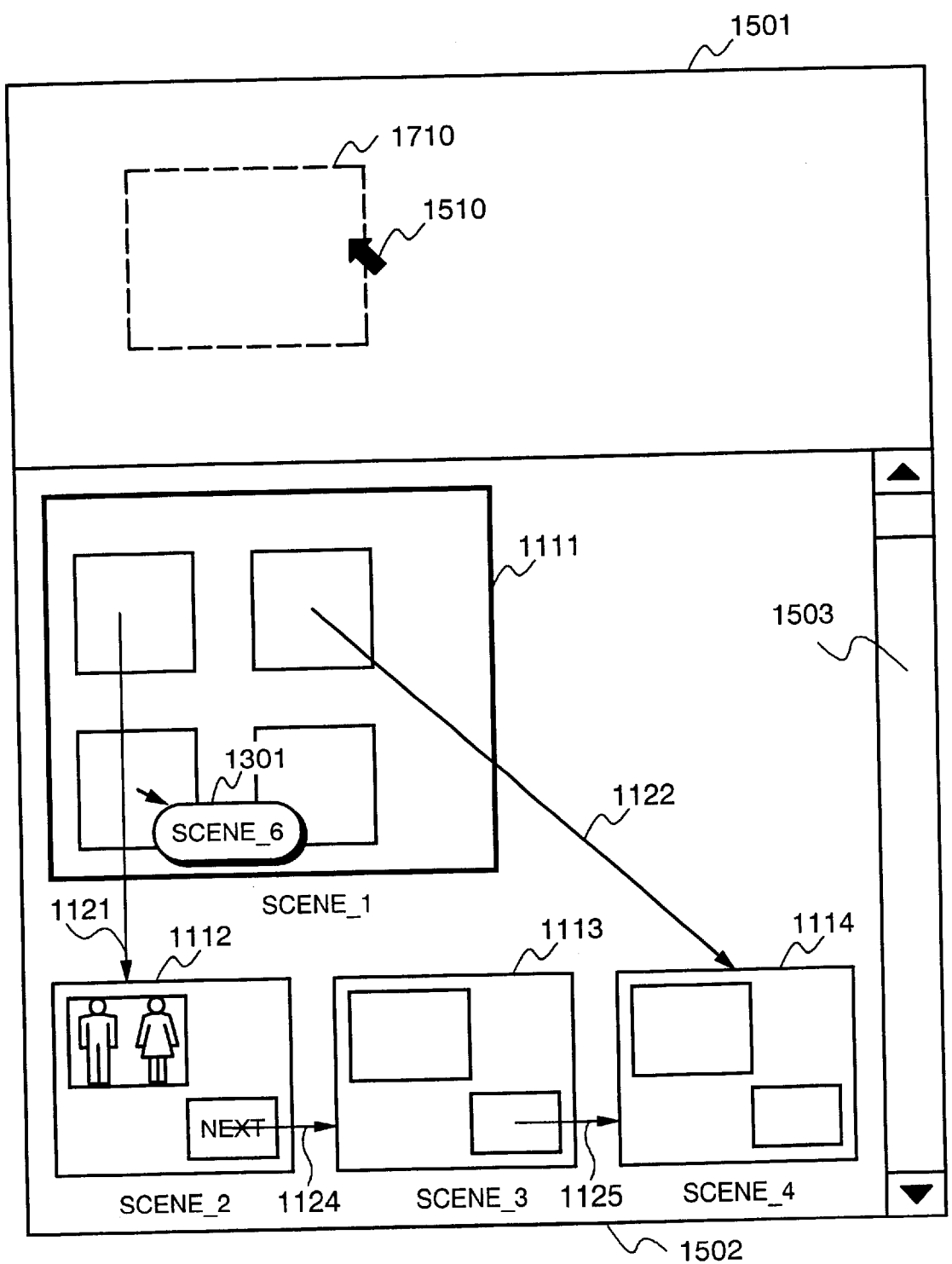
FIG. 17 is a view showing an example of a constitution of a display screen in the case of performing an edit work by the use of a non-scroll region, and also showing an operation for displaying the specified items to be displayed in the non-scroll region.

FIG. 17 shows an operation of displaying the specified display object on the non-scroll region. This example shows the state in moving the pointing cursor 1510 to the non-scroll region 1501 by dragging a mouse with the node icon 1111 specified thereby. On the non-scroll region 1501, a frame of a broken line 1710 is shown indicating the display object has been moved there according to the pointing cursor 1510.

Figure 18:
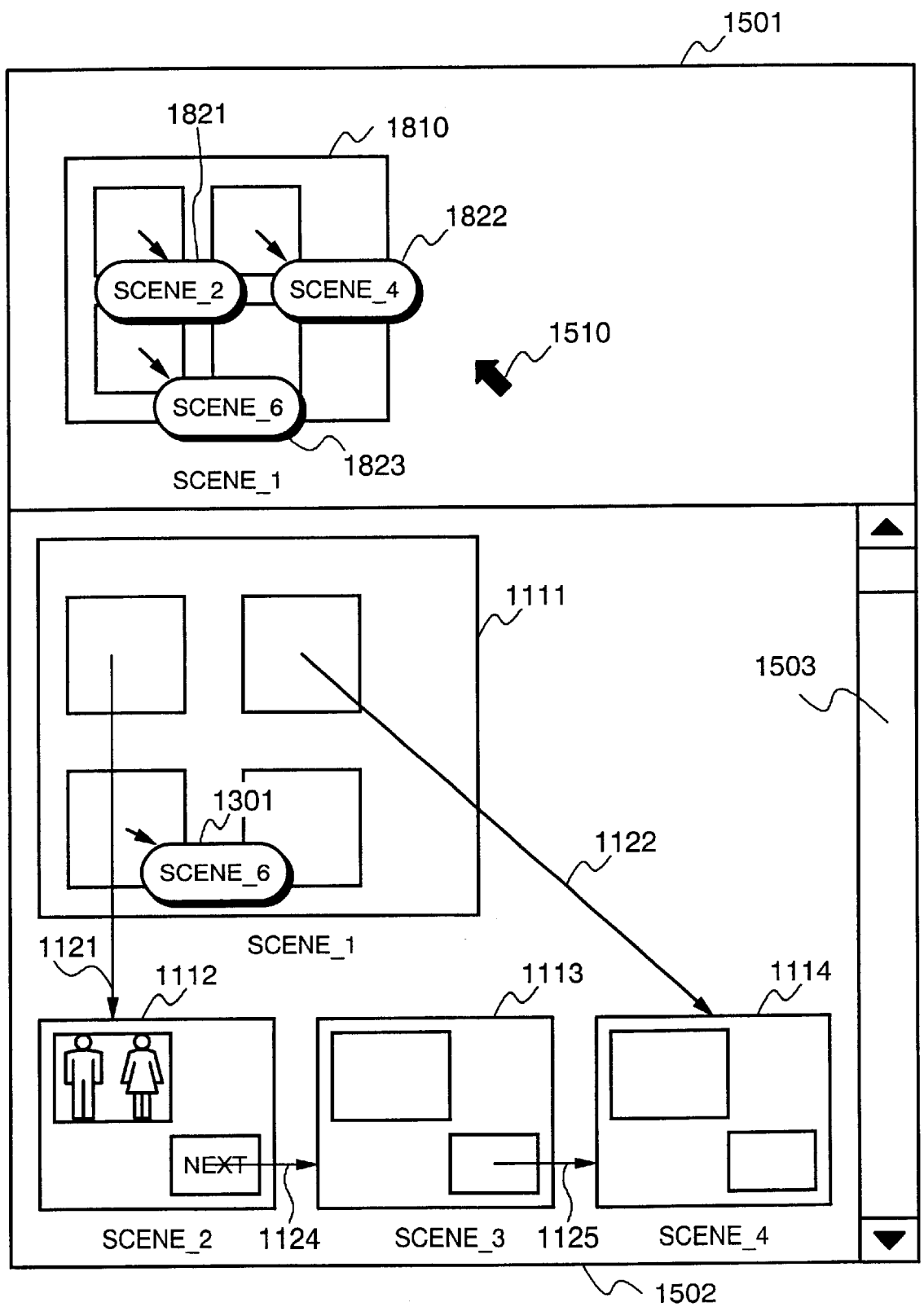
FIG. 18 is a view showing an example of a constitution of a display screen in the case of performing an edit work by the use of a non-scroll region, and also showing the state when the shift to the non-scroll region to be displayed has been completed.

FIG. 18 shows the state in which the display object has been completely moved to the non-scroll region. Namely, it is the state in which the mouse button is released after moving the display object to some position of the non-scroll region. This example shows the node icon 1810 indicating the presentation screen "SCENE_1" on the non-scroll region 1501. On the node icon 1810, link arrows with tags 1821, 1822, 1823 are respectively provided correspondingly to the link arrows 1121, 1122 and the link arrow with a tag 1301 related with the node icon 1111 indicating the presentation screen "SCENE_1" on the scroll region 1501.

FIG. 19 is a view for use in describing the edit-time display manner stored in the edit-time display manner storage unit 107 in the case of performing the edit operation described in reference to FIGS. 15 to 18. As shown in FIG. 19, "yes" is filled in the item "Display a non-scroll image?", as for the presentation screen "SCENE_1" corresponding to the node icon displayed on the non-scroll region.

Figure 20:
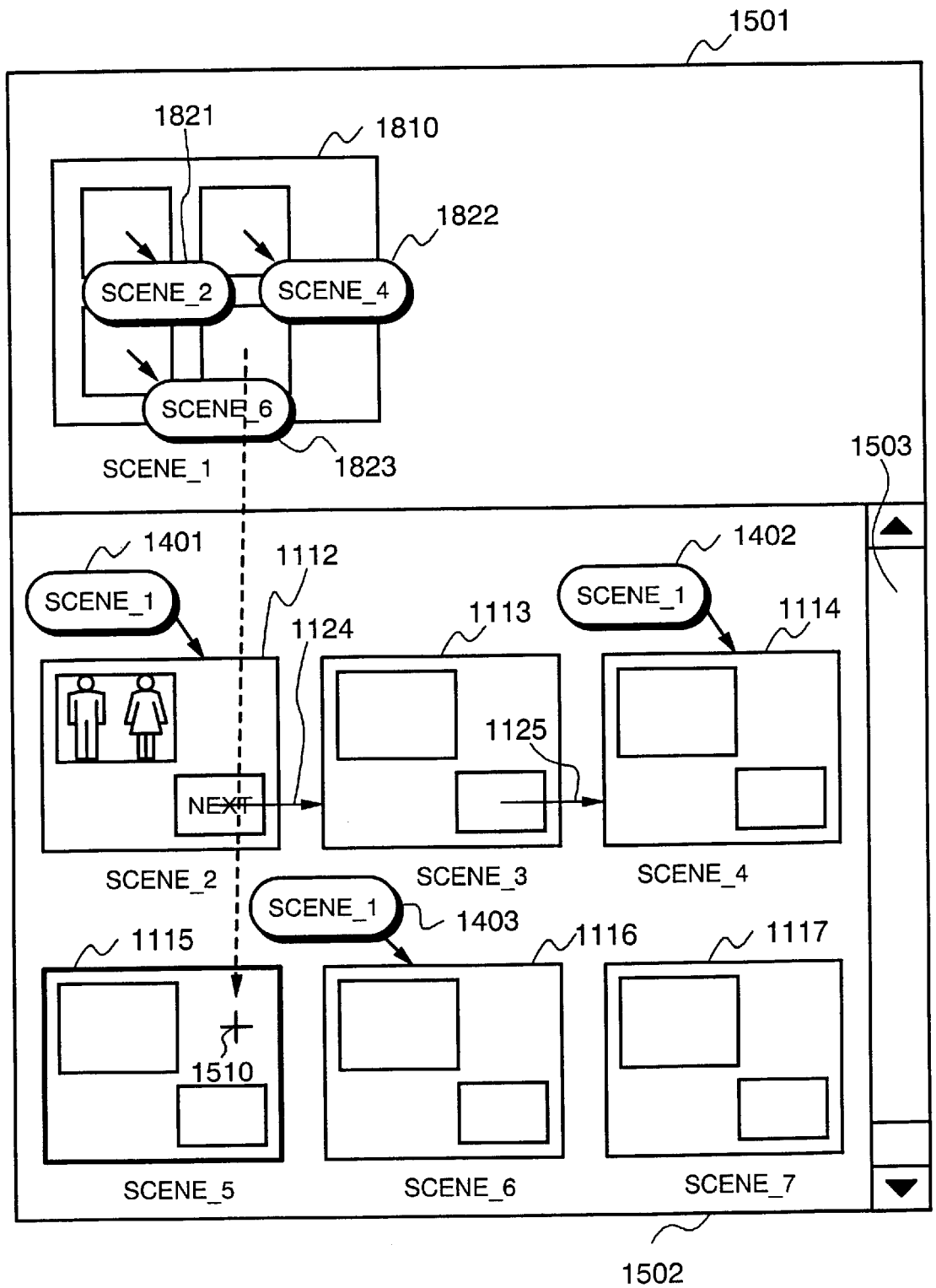
FIG. 20 is a view showing an example of a constitution of a display screen in the case of performing an edit work by the use of a non-scroll region, and also showing an edit work for adding a screen shift processing by the use of the non-scroll region.
Figure 21:
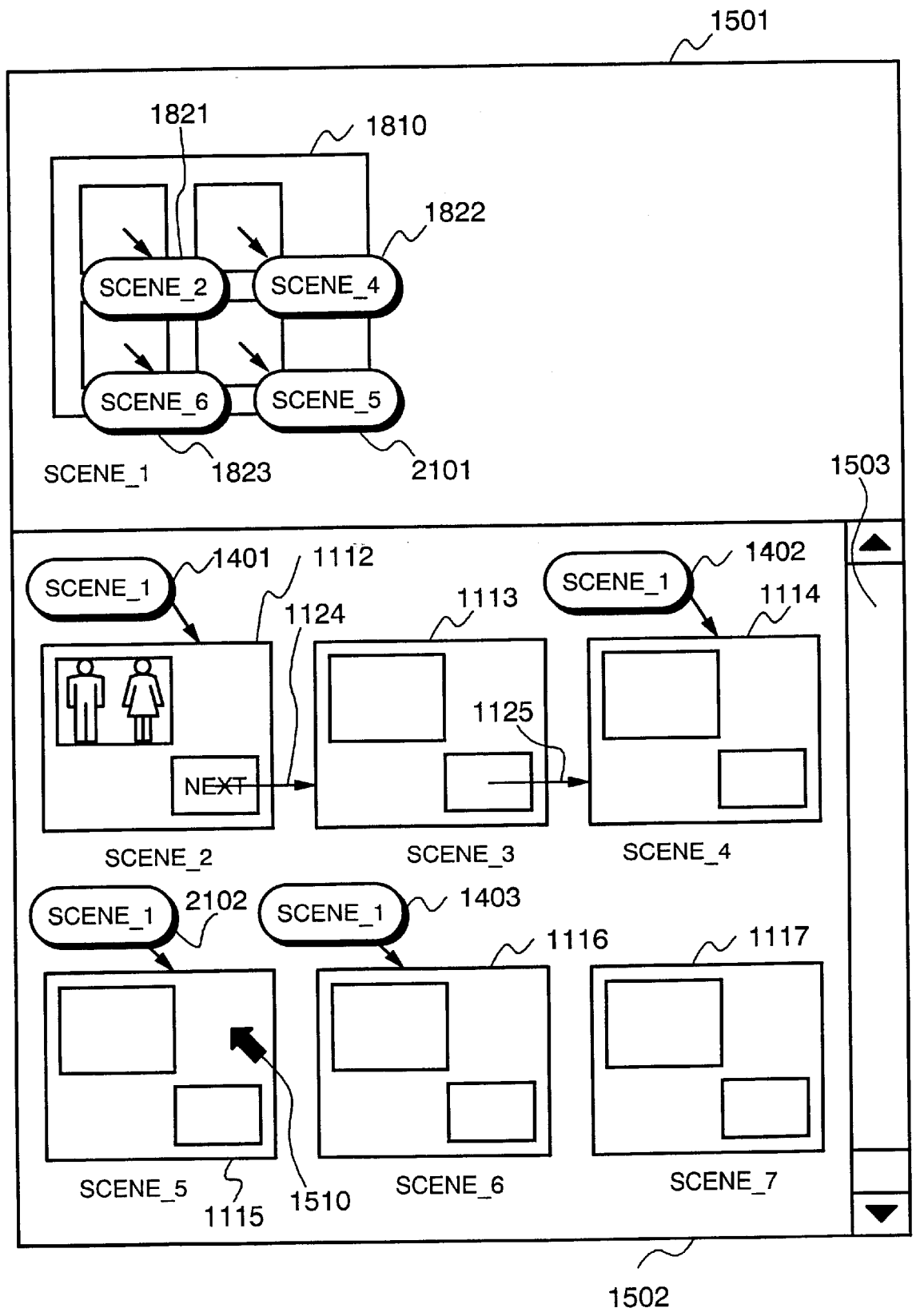
FIG. 21 is a view showing an example of a constitution of a display screen in the case of performing an edit work by the use of a non-scroll region, and also showing the state when the edit work for adding a screen shift processing by the use of the non-scroll region.
Figure 23:
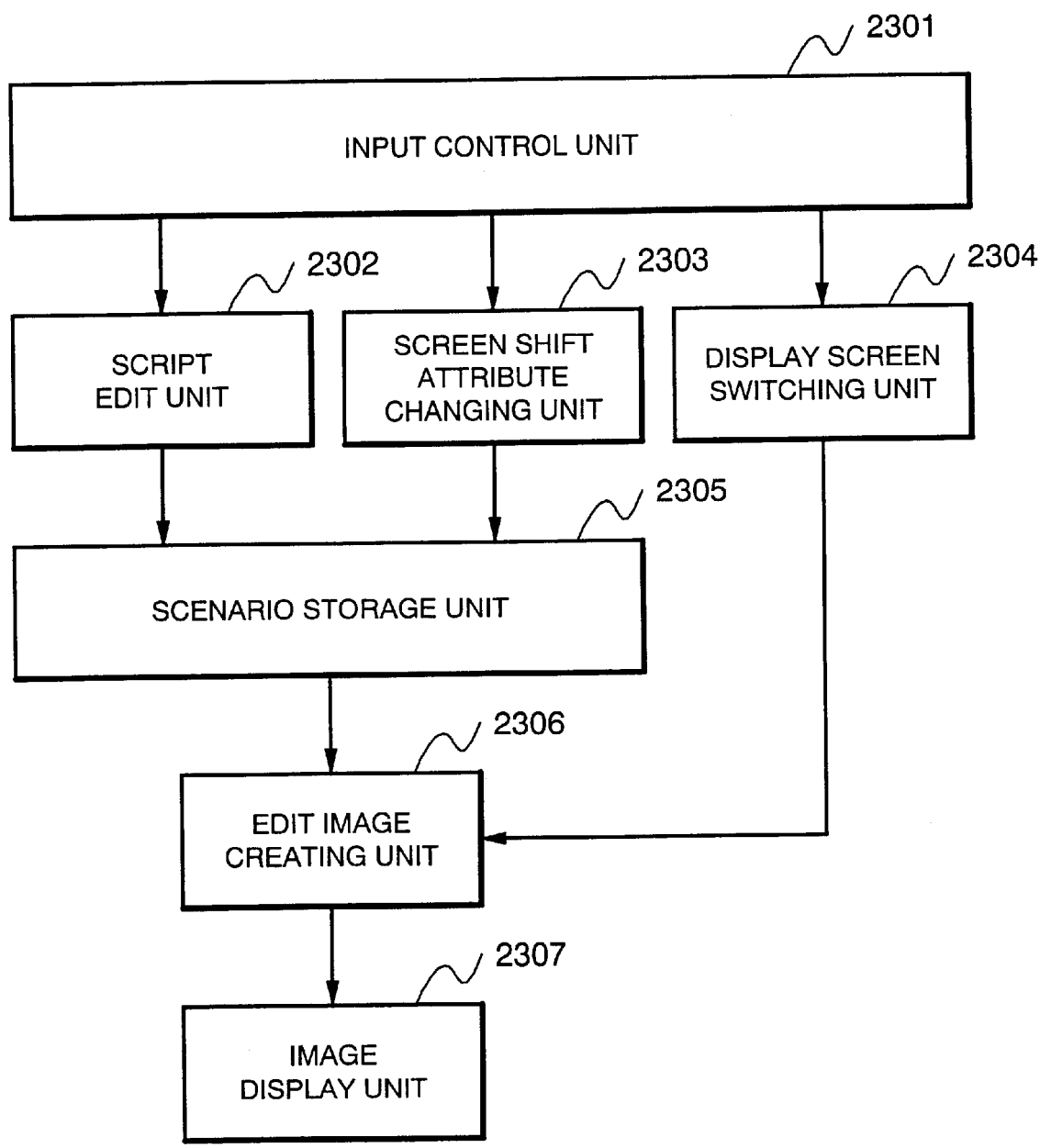
FIG. 23 is a block diagram showing a constitution of the conventional scenario edit device.
Figure 25:
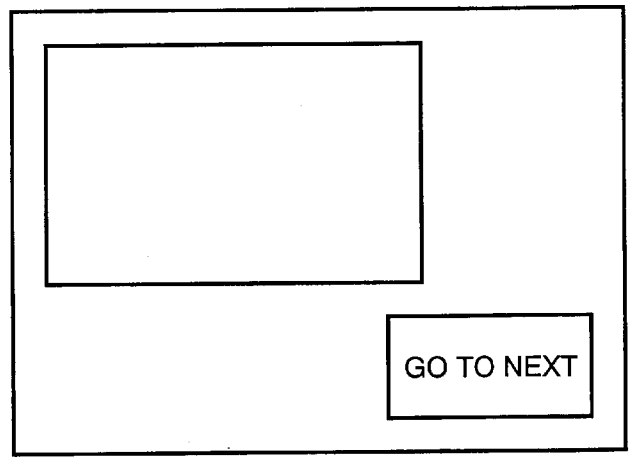
FIG. 25 is a view showing an edit screen in the conventional scenario edit device.
Figure 26:
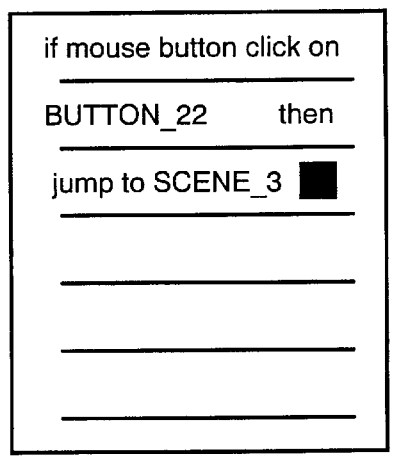
FIG. 26 is a view showing an edit screen for use in editing script characters in the conventional scenario edit device.
Figure 27:
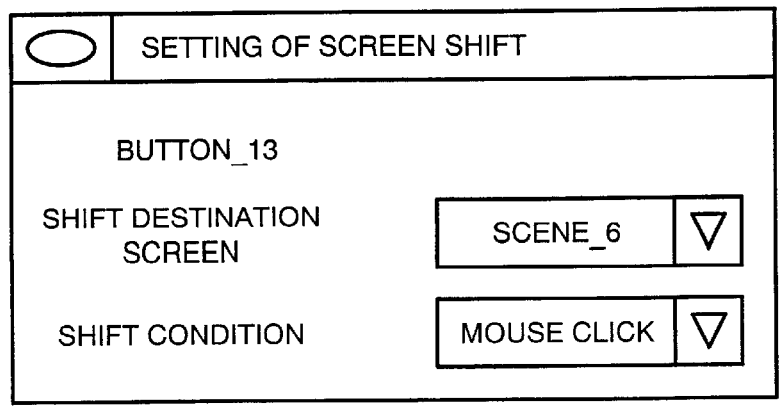
FIG. 27 is a view showing an edit screen for use in changing a screen shift attribute in the conventional scenario edit device.

FIGS. 20 and 21 are views each showing the display screen on the image display unit 112 in the case of performing the edit operation of adding an image shift processing by connecting the data icon within the node icon displayed in the non-scroll region and the node icon in the scroll region by use of a link arrow.

On the display screen of FIG. 20, in which the node icon 1810 of the presentation screen "SCENE_1" is displayed in the non-scroll region 1501 as indicated in FIG. 18, the lower portion of the edit region 1101 indicated in FIGS. 11 and 12 is displayed in the scroll region 1502 while operating the scroll bar 1503. The image displayed in the scroll region 1502 is identical to that indicated in FIG. 14.

Further, in FIG. 20, an edit operation of entering a link arrow is executed in order to add an image shift processing from the data icon disposed in the node icon 1810 displayed in the non-scroll region 1501 to the node icon 1115 on the presentation screen "SCENE_5" displayed in the scroll region 1502. The operation of entering the link arrow is similar to that described in reference to FIG. 5. Specifically, the mouse button is pressed with the pointing cursor 1510 located on the objective data icon in the node icon 1810, and the pointing cursor 1510 is moved to the node icon 1115 while dragging the mouse there. This example shows an arrow of a broken line starting from the data icon of a link source to the end point "+" of the pointing cursor 1510 indicating the dragging operation according to the movement of the pointing cursor.

FIG. 21 shows the state in which the edit operation of adding a screen shift has been completed. As illustrated in FIG. 21, since the display image of the non-scroll region 1501 is independent of the display image of the scroll region 1502, the data icon in the node icon 1810 and the node icon 1115 cannot be connected directly by a link arrow. Similarly to the other screen shift processing, the link arrow with a tag "SCENE_5" 2101 indicating the presentation screen of the link destination is attached on the data icon in the node icon 1810, while the link arrow with a tag "SCENE_1" 2102 indicating the presentation screen of the link source is attached on the node icon 1115.

The scenario indicated in FIG. 22 is a scenario stored in the scenario storage unit 106 after performing an edit work of drawing a link arrow from the data icon within the node icon displayed in the non-scroll region to the node icon in the scroll region, on the scenario indicated in FIG. 2, according to the edit operation described in reference to FIGS. 21 and 22.

When an editor performs the edit operation described in reference to FIGS. 15 to 18 by use of the display screen including the non-scroll region 1501 and the scroll region 1502, the non-scroll node specification unit 104 judges that the edit operation of specifying the non-scroll image display of the node icon indicating the presentation screen "SCENE_1" has been performed. As indicated in FIG. 19, "Yes" is filled in the item "Display a non-scroll image?" with respect to the node whose ID number is 1, which is stored in the edit-time display manner storage unit 107. The non-scroll node image creating unit 111 creates a non-scroll edit image with the node icon whose node ID number is 1 disposed there, with reference to the edit-time display manner stored in the edit-time display manner storage unit 107. The image display unit 112 displays the edit image created by the edit image creating unit 110 and the non-scroll edit image created by the non-scroll edit image creating unit 111 which are combined on the display screen as illustrated in FIG. 18.

When an editor executes an edit operation described in reference to FIGS. 20 and 21, the screen shift changing unit 103 judges that it is the operation of adding a screen shift from the data icon indicating the multi-media data "DATA_14" to the presentation screen "SCENE_5". As illustrated in FIG. 22, "SCENE_5" is filled in the item "Presentation Screen Name of Link Destination", and "mouse click" is filled in the item "Screen Shift Condition", so to be stored in the scenario storage unit 106.

Hereinabove, the edit operation of adding a screen shift by drawing a link arrow from the data icon within the node icon in the non-scroll region to the node icon in the scroll region has been described. However, an edit operation of adding a screen shift by drawing a link arrow from the data icon within the node icon in the scroll region to the node icon in the non-scroll region can be executed in the similar procedure.

As set forth hereinabove, according to the scenario edit device of the present invention, the presentation screens to be presented at execution of an application are made into icons and the screen shift relation between the presentation screens is shown by an arrow or the like on the edit screen for editing the scenario for a multi-media application, so as to look at the hyperlink structure at a glance. Therefore, it is advantageous in that an editor can grasp the structure of the scenario visually and intuitively, thereby to improve the working efficiency in the edit work.

The scenario edit on the screen shift can be performed by the intuitive operation such as creating a screen shift processing by drawing an arrow between icons of the presentation screens, changing a shift destination and a shift source by changing an arrow, and deleting a screen shift processing by deleting an arrow. Therefore, it is not necessary for a scenario editor to learn a script language and memorize the presentation screen name of a shift destination, thereby to reduce the burden of the scenario editor and to improve more efficiency in the edit work.

Further, an edit work can be performed by a visual and intuitive operation, and an editor can confirm the edit work easily and surely, thereby to reduce the errors in the created scenario.

Furthermore, when the size of the region of an edit image for use in the edit work is larger than the display size of the display screen, an edit image with a scroll bar can be created so to be displayed on the display screen, so that an editor can perform an edit work on the whole edit image by operating the scroll bar. Therefore, the edit work can be performed by a visual and intuitive operation similarly on the scenario having a lot of presentation screens and complicated shift relation, thereby to prevent from the decrease in the working efficiency.

When the size of the region of an edit image for use in the edit work is larger than the display size of the display screen, the display screen is divided into a non-scroll region and a scroll region, and some node icon is displayed on the non-scroll region, thereby performing the edit work on the screen shift processing between the icons which cannot be displayed on the display screen at once by a visual and intuitive operation and preventing the decrease in the working efficiency.

Although the invention has been illustrate d and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A scenario edit device for editing a scenario describing links between presentation screens, comprising:

a scenario storage means for storing the scenario;

a node icon creating means for creating a node icon representative of a presentation screen described in the scenario and a data icon associated with and disposed within the node icon;

a link graphic creating means for creating a link graphic connecting a data icon associated with a node icon of one presentation screen to a node icon of another presentation screen to designate a link from said one presentation screen to said another presentation screen;

an edit image creating means for creating an edit image with the node icons, the data icon, and the link graphic;

an edit-time display manner storage means for storing an edit-time display manner including information on at least the display position of the node icon within the edit image;

an image display means for displaying the edit image created by said edit image creating means;

an input control means for controlling an input signal that was entered from a given input device using the edit image displayed on said image display means and preserving information about the input signal; and a screen shift changing means for detecting an edit operation for a screen shift processing from the information preserved in said input control means, and updating the scenario stored in said scenario storage means according to the edit operation.

2. A scenario edit device as set forth in claim 1, wherein said node icon creating means comprises:
- a data icon creating means for creating the data icon, wherein the data icon indicates multi-media data to be presented on the presentation screen, and
- a data icon disposing means for disposing the data icon within the node icon.

3. A scenario edit device as set forth in claim 1, wherein said node icon creating means comprises:
- a data icon creating means for creating the data icon, wherein the data icon is formed in a reduction image, including a thumbnail image, or in a schematic graphic, including a rectangular image, of multi-media data to be presented on the presentation screen, and
- a data icon disposing means for disposing the data icon within the node icon.

4. A scenario edit device as set forth in claim 1,
wherein the edit operation for the screen shift processing includes at least an edit operation of drawing a link graphic, an edit operation of changing a link source or a link destination of the link graphic being displayed, and an edit operation of deleting the link graphic being displayed, and
wherein said screen shift changing means,
in the case of drawing a link graphic, adds a screen shift processing indicated by the added link graphic into the scenario stored in said scenario storage means,
in the case of changing a link source or a link destination of the link graphic, changes the corresponding shift source or shift destination indicated by the changed link graphic in the scenario stored in said scenario storage means, and
in the case of deleting the link graphic, deletes the corresponding screen shift processing indicated by the deleted link graphic in the scenario stored in said scenario storage means.

5. A scenario edit device for editing a scenario describing links between presentation screens, comprising:
- a scenario storage means for storing the scenario;
- a node icon creating means for creating a node icon representative of a presentation screen described in the scenario and a data icon associated with and disposed within the node icon;
- a link graphic creating means for creating a link graphic connecting a data icon associated with a node icon of one presentation screen to a node icon of another presentation screen to designate a link from said one presentation screen to said another presentation screen;
- an edit image creating means for creating an edit image with the node icons, the data icon, and the link graphic;
- an edit-time display manner storage means for storing information indicating a position of the node icon within the edit image;
- a scroll control means for instructing said edit image creating means to create an edit image with a scroll bar attached thereto when the size of a region of the edit image created by said edit image creating means is larger than the display size of the display screen on said image display means;
- a screen shift analyzing means for analyzing screen shift information described in the scenario stored in said scenario storage means and the information on the display position of the node icon stored in said edit-time display manner storage means, and instructing said edit image creating means to display the link graphic with a tag indicating a link destination or a link source when the link destination or the link source lies outside the display screen;
- an image display means for displaying the edit image created by said edit image creating means;
- an input control means for controlling an input signal that was entered from a given input device using the edit image displayed on said image display means and preserving information about the input signal; and
- a screen shift changing means for detecting an edit operation for a screen shift processing from the information preserved in said input control means, and updating the scenario stored in said scenario storage means according to the edit operation.

6. A scenario edit device as set forth in claim 5, wherein said node icon creating means comprises:
- a data icon creating means for creating the data icon, wherein the data icon indicates multi-media data to be presented on the presentation screen, and
- a data icon disposing means for disposing the data icon within the node icon.

7. A scenario edit device as set forth in claim 5, wherein said node icon creating means comprises:
- a data icon creating means for creating the data icon, wherein the data icon is formed in a reduction image or in a schematic graphic of multi-media data to be presented on the presentation screen, and
- a data icon disposing means for disposing the data icon within the node icon.

8. A scenario edit device as set forth in claim 5,
wherein the edit operation for the screen shift processing includes at least an edit operation of drawing a link graphic, an edit operation of changing a link source or a link destination of the link graphic being displayed, and an edit operation of deleting the link graphic being displayed, and
wherein said screen shift changing means,
in the case of drawing a link graphic, adds a screen shift processing indicated by the added link graphic into the scenario stored in said scenario storage means,
in the case of changing a link source or a link destination of the link graphic, changes the corresponding shift source or shift destination indicated by the changed link graphic in the scenario stored in said scenario storage means, and
in the case of deleting the link graphic, deletes the corresponding screen shift processing indicated by the deleted link graphic in the scenario stored in said scenario storage means.

9. A scenario edit device for editing a scenario describing links between presentation screens, comprising:
- a scenario storage means for storing the scenario;
- a node icon creating means for creating a node icon representative of a presentation screen described in the scenario;
- a link graphic creating means for creating a link graphic designating links between the presentation screens;
- an edit image creating means for creating an edit image with the node icon and the link graphic;
- an edit-time display manner storage means for storing information indicating a position of the node icon within the edit image;

a scroll control means for instructing said edit image creating means to create an edit image with a scroll bar attached thereto when the size of a region of the edit image created by said edit image creating means is larger than the display size of the display screen on said image display means;

a screen shift analyzing means for analyzing screen shift information described in the scenario stored in said scenario storage means and the information on the display position of the node icon stored in said edit-time display manner storage means, and instructing said edit image creating means to display the link graphic with a tag indicating a link destination or a link source when the link destination or the link source lies outside the display screen;

a non-scroll edit image creating means for creating a non-scroll edit image, that is not scrolled and independent of the edit image with the scroll bar, when said edit image creating means creates the edit image with the scroll bar;

an image display means for displaying the edit image created by said edit image creating means, and for displaying the display screen divided into a scroll region for displaying the edit image with the scroll bar and a non-scroll display region for displaying the non-scroll edit image when said edit image creating means creates the edit image with the scroll bar and said non-scroll edit image creating means creates the non-scroll edit image;

an input control means for controlling an input signal that was entered from a given input device using the edit image displayed on said image display means or the display image consisting of the scroll region and the non-scroll region, and preserving information about the input signal;

a screen shift changing means for detecting an edit operation for a screen shift processing from the information preserved in said input control means, and updating the scenario stored in said scenario storage means according to the edit operation; and a non-scroll display specification means for detecting an edit operation for displaying a node icon in the non-scroll region displayed on the display screen of said image display means, from the information preserved in said input control means, and updating the edit-time display manner stored in said edit-time display manner storage means according to the edit operation.

10. A scenario edit device as set forth in claim 9, wherein said screen shift changing means, in the case of drawing a link graphic, adds a screen shift processing indicated by the added link graphic into the scenario stored in said scenario storage means, in the case of changing a link source or a link destination of the link graphic, changes the corresponding shift source or shift destination indicated by the changed link graphic in the scenario stored in said scenario storage means, and in the case of deleting the link graphic, deletes the corresponding screen shift processing indicated by the deleted link graphic in the scenario stored in said scenario storage means.

11. A scenario edit device as set forth in claim 9, wherein said screen shift changing means detects an edit operating of drawing a link graphic extending between the scroll region and the non-scroll region, and updates the scenario stored in said scenario storage means according to the edit operation, and said screen shift analyzing means, in the case of drawing the link graphic extending between the scroll region and the non-scroll region, and instructs said edit image creating means to display the link graphic with a tag reflecting the edit operation at a link source or a link destination specified by the edit operation.

12. A method of editing a scenario that describes links between presentation screens, comprising the steps of:

storing the scenario;

creating node icons representative of the presentation screens described in the scenario, data icons each of which is associated with and disposed within a respective node icon, and link graphic indicating links between the presentation screens;

displaying the node icons, the data icons, and the link graphic as an edit image;

selecting a data icon associated with a node icon of one presentation screen using the edit image;

designating a link between said one presentation screen and another presentation screen by drawing a link graphic connecting the selected data icon with a node icon of said another presentation screen using the edit image; and updating the scenario based on the designated link.

13. A method as set forth in claim 12, wherein the link graphic is displayed to indicate all of the links described in the scenario.

14. A method as set forth in claim 13, wherein, if the entire edit image cannot be displayed at one time, a tag is displayed on the edit image to indicate a link to a node icon that is not displayed on the edit image.

15. A method as set forth in claim 14, wherein, if the entire edit image cannot be displayed at one time, the edit image is displayed with a scroll bar.

16. A method as set forth in claim 14, further comprising the steps of designating a non-scroll region and a scroll region in the edit image and selecting node icons and data icons to be displayed in the non-scroll region.

17. A method as set forth in claim 16, wherein a link can be designated between a presentation screen whose node icon is displayed in the non-scroll region and a presentation screen whose node icon is displayed in the scroll region.

18. A method as set forth in claim 12, wherein the steps of selecting the data icon and designating the link include the steps of:

pointing a cursor at the data icon using an input device;

pressing an input button of the input device when the cursor is pointed at the data icon to designate a beginning point of the link graphic; and repositioning the cursor to point at the node icon of said another presentation screen while keeping the input button pressed to designated an end point of the link graphic.

* * * * *